United States Patent
Trude et al.

(10) Patent No.: US 8,529,975 B2
(45) Date of Patent: *Sep. 10, 2013

(54) MULTI-FUNCTIONAL BASE FOR A PLASTIC, WIDE-MOUTH, BLOW-MOLDED CONTAINER

(75) Inventors: Greg Trude, Seven Valleys, PA (US); John W. Tobias, Spartanburg, SC (US); Richard K. Ogg, Littlestown, PA (US)

(73) Assignee: Graham Packaging Company, L.P., York, PA (US)

( * ) Notice: Subject to any disclaimer, the term of this patent is extended or adjusted under 35 U.S.C. 154(b) by 796 days.

This patent is subject to a terminal disclaimer.

(21) Appl. No.: 12/250,756

(22) Filed: Oct. 14, 2008

(65) Prior Publication Data

US 2009/0092720 A1    Apr. 9, 2009

Related U.S. Application Data

(63) Continuation of application No. 10/851,083, filed on May 24, 2004, now Pat. No. 7,543,713, which is a continuation-in-part of application No. 10/444,616, filed on May 23, 2003, now abandoned, which is a continuation-in-part of application No. 10/124,734, filed on Apr. 17, 2002, now Pat. No. 6,612,451.

(60) Provisional application No. 60/284,795, filed on Apr. 19, 2001.

(51) Int. Cl.
A23B 5/005    (2006.01)

(52) U.S. Cl.
USPC ........... 426/399; 220/609; 215/371; 215/372; 215/373; 215/375; 215/376; 215/382

(58) Field of Classification Search
USPC ................. 426/399; 215/371, 372, 373, 375, 215/376, 382; 220/609
See application file for complete search history.

(56) References Cited

U.S. PATENT DOCUMENTS

| 1,499,239 A | 6/1924 | Malmquist |
| 2,142,257 A | 1/1937 | Saeta |
| D110,624 S | 7/1938 | Mekeel, Jr. |

(Continued)

FOREIGN PATENT DOCUMENTS

| AU | 2002257159 B2 | 4/2003 |
| CA | 2077717 A1 | 3/1993 |

(Continued)

OTHER PUBLICATIONS

Final Office Action dated Jun. 17, 2010 for U.S. Appl. No. 12/250,856.

(Continued)

*Primary Examiner* — Rena Dye
*Assistant Examiner* — Chaim Smith
(74) *Attorney, Agent, or Firm* — Baker Botts LLP

(57) ABSTRACT

A container can have a body with an integrally formed base attached to the body. The base includes a concave annular wall extending from the container sidewall to a standing surface, and an inner wall extending from the standing surface to a substantially flat inner annular wall. The inner annular wall is recessed in the base and is substantially perpendicular to the container sidewall. The inner annular wall includes a centrally located dimple. The dimple includes a plurality of spaced apart and radially extending indented ribs. One or more of the ribs extend radially into a brace that tapers to meet the inner annular wall.

16 Claims, 12 Drawing Sheets

(56) References Cited

U.S. PATENT DOCUMENTS

| | | |
|---|---|---|
| 2,124,959 A | 7/1938 | Vogel |
| 2,378,324 A | 6/1945 | Ray et al. |
| 2,880,902 A | 4/1959 | Owsen |
| 2,960,248 A | 11/1960 | Kuhlman |
| 2,971,671 A | 2/1961 | Shakman |
| 2,982,440 A | 5/1961 | Harrison |
| 3,043,461 A | 7/1962 | Glassco |
| 3,081,002 A | 3/1963 | Tauschinski et al. |
| 3,090,478 A | 5/1963 | Stanley |
| 3,142,371 A | 7/1964 | Rice et al. |
| 3,174,655 A | 3/1965 | Hurschman |
| 3,198,861 A | 8/1965 | Marvel |
| 3,301,293 A | 1/1967 | Santelli |
| 3,325,031 A | 6/1967 | Singier |
| 3,397,724 A | 8/1968 | Bolen et al. |
| 3,409,167 A | 11/1968 | Blanchard |
| 3,417,893 A | 12/1968 | Lieberman |
| 3,426,939 A | 2/1969 | Young |
| 3,468,443 A | 9/1969 | Marcus |
| 3,483,908 A | 12/1969 | Donovan |
| 3,485,355 A | 12/1969 | Stewart |
| 3,693,828 A | 9/1972 | Kneusel et al. |
| 3,704,140 A | 11/1972 | Petit et al. |
| 3,727,783 A | 4/1973 | Carmichael |
| 3,819,789 A | 6/1974 | Parker |
| 3,904,069 A | 9/1975 | Toukmanian |
| 3,918,920 A | 11/1975 | Barber |
| 3,935,955 A | 2/1976 | Das |
| 3,941,237 A | 3/1976 | MacGregor, Jr. |
| 3,942,673 A | 3/1976 | Lyu et al. |
| 3,949,033 A | 4/1976 | Uhlig |
| 3,956,441 A | 5/1976 | Uhlig |
| 4,036,926 A | 7/1977 | Chang |
| 4,037,752 A | 7/1977 | Dulmaine et al. |
| 4,117,062 A | 9/1978 | Uhlig |
| 4,123,217 A | 10/1978 | Fischer et al. |
| 4,125,632 A | 11/1978 | Vosti et al. |
| 4,134,510 A | 1/1979 | Chang |
| 4,158,624 A | 6/1979 | Ford et al. |
| 4,170,622 A | 10/1979 | Uhlig |
| 4,170,662 A | 10/1979 | Weiss et al. |
| 4,174,782 A | 11/1979 | Obsomer |
| 4,219,137 A | 8/1980 | Hutchens |
| 4,231,483 A | 11/1980 | Dechenne et al. |
| 4,247,012 A | 1/1981 | Alberghini |
| 4,301,933 A | 11/1981 | Yoshino et al. |
| 4,318,489 A | 3/1982 | Snyder et al. |
| 4,318,882 A | 3/1982 | Agrawal et al. |
| 4,338,765 A | 7/1982 | Ohmori et al. |
| 4,355,728 A | 10/1982 | Ota et al. |
| 4,377,191 A | 3/1983 | Yamaguchi |
| 4,378,328 A | 3/1983 | Przytulla et al. |
| 4,381,061 A | 4/1983 | Cerny et al. |
| D269,158 S | 5/1983 | Gaunt et al. |
| 4,386,701 A | 6/1983 | Galer |
| 4,436,216 A | 3/1984 | Chang |
| 4,444,308 A | 4/1984 | MacEwen |
| 4,450,878 A | 5/1984 | Takada et al. |
| 4,465,199 A | 8/1984 | Aoki |
| 4,497,855 A | 2/1985 | Agrawal et al. |
| 4,525,401 A | 6/1985 | Pocock et al. |
| 4,542,029 A | 9/1985 | Caner et al. |
| 4,610,366 A | 9/1986 | Estes et al. |
| 4,628,669 A | 12/1986 | Herron et al. |
| 4,642,968 A | 2/1987 | McHenry et al. |
| 4,645,078 A | 2/1987 | Reyner |
| 4,667,454 A | 5/1987 | McHenry et al. |
| 4,684,025 A | 8/1987 | Copland et al. |
| 4,685,273 A | 8/1987 | Caner et al. |
| D292,378 S | 10/1987 | Brandt et al. |
| 4,723,661 A | 2/1988 | Hoppmann et al. |
| 4,724,855 A | 2/1988 | Jackson et al. |
| 4,747,507 A | 5/1988 | Fitzgerald et al. |
| 4,749,092 A | 6/1988 | Sugiura et al. |
| 4,769,206 A | 9/1988 | Reymann et al. |
| 4,773,458 A | 9/1988 | Touzani |
| 4,785,949 A | 11/1988 | Krishnakumar et al. |
| 4,785,950 A | 11/1988 | Miller et al. |
| 4,807,424 A | 2/1989 | Robinson et al. |
| 4,813,556 A | 3/1989 | Lawrence |
| 4,831,050 A | 5/1989 | Cassidy et al. |
| 4,836,398 A | 6/1989 | Leftault, Jr. et al. |
| 4,840,289 A | 6/1989 | Fait et al. |
| 4,850,493 A | 7/1989 | Howard, Jr. |
| 4,850,494 A | 7/1989 | Howard, Jr. |
| 4,865,206 A | 9/1989 | Behm et al. |
| 4,867,323 A | 9/1989 | Powers |
| 4,880,129 A | 11/1989 | McHenry et al. |
| 4,887,730 A | 12/1989 | Touzani |
| 4,892,205 A | 1/1990 | Powers et al. |
| 4,896,205 A | 1/1990 | Weber |
| 4,921,147 A | 5/1990 | Poirier |
| 4,962,863 A | 10/1990 | Wendling et al. |
| 4,967,538 A | 11/1990 | Leftault, Jr. et al. |
| 4,978,015 A | 12/1990 | Walker |
| 4,997,692 A | 3/1991 | Yoshino |
| 5,004,109 A | 4/1991 | Bartley et al. |
| 5,005,716 A | 4/1991 | Eberle |
| 5,014,868 A | 5/1991 | Wittig et al. |
| 5,024,340 A | 6/1991 | Alberghini et al. |
| 5,033,254 A | 7/1991 | Zenger |
| 5,060,453 A | 10/1991 | Alberghini et al. |
| 5,067,622 A | 11/1991 | Garver et al. |
| 5,090,180 A | 2/1992 | Sorensen |
| 5,092,474 A | 3/1992 | Leigner |
| 5,122,327 A | 6/1992 | Spina et al. |
| 5,133,468 A | 7/1992 | Brunson et al. |
| 5,141,121 A | 8/1992 | Brown et al. |
| 5,178,290 A | 1/1993 | Ota et al. |
| 5,199,587 A | 4/1993 | Ota et al. |
| 5,199,588 A | 4/1993 | Hayashi |
| 5,201,438 A | 4/1993 | Norwood |
| 5,217,737 A | 6/1993 | Gygax et al. |
| 5,234,126 A | 8/1993 | Jonas et al. |
| 5,244,106 A | 9/1993 | Takacs |
| 5,251,424 A | 10/1993 | Zenger et al. |
| 5,255,889 A | 10/1993 | Collette et al. |
| 5,261,544 A | 11/1993 | Weaver, Jr. |
| 5,279,433 A | 1/1994 | Krishnakumar et al. |
| 5,281,387 A | 1/1994 | Collette et al. |
| 5,310,043 A | 5/1994 | Alcorn |
| 5,333,761 A | 8/1994 | Davis et al. |
| 5,341,946 A | 8/1994 | Valliencourt et al. |
| 5,392,937 A | 2/1995 | Prevot et al. |
| 5,411,699 A | 5/1995 | Collette et al. |
| 5,454,481 A | 10/1995 | Hsu |
| 5,472,105 A | 12/1995 | Krishnakumar et al. |
| 5,472,181 A | 12/1995 | Lowell |
| RE35,140 E | 1/1996 | Powers, Jr. |
| 5,484,052 A | 1/1996 | Pawloski et al. |
| 5,503,283 A | 4/1996 | Semersky |
| 5,543,107 A | 8/1996 | Malik et al. |
| 5,593,063 A | 1/1997 | Claydon et al. |
| 5,598,941 A | 2/1997 | Semersky et al. |
| 5,632,397 A | 5/1997 | Fandeux et al. |
| 5,642,826 A | 7/1997 | Melrose |
| 5,672,730 A | 9/1997 | Cottman |
| 5,687,874 A | 11/1997 | Omori et al. |
| 5,690,244 A | 11/1997 | Darr |
| 5,704,504 A | 1/1998 | Bueno |
| 5,713,480 A | 2/1998 | Petre et al. |
| 5,730,314 A | 3/1998 | Wiemann et al. |
| 5,730,914 A | 3/1998 | Ruppmann, Sr. |
| 5,735,420 A | 4/1998 | Nakamaki et al. |
| 5,737,827 A | 4/1998 | Kuse et al. |
| 5,758,802 A | 6/1998 | Wallays |
| 5,762,221 A | 6/1998 | Tobias et al. |
| 5,780,130 A | 7/1998 | Hansen et al. |
| 5,785,197 A | 7/1998 | Slat |
| 5,819,507 A | 10/1998 | Kaneko et al. |
| 5,829,614 A | 11/1998 | Collette et al. |
| 5,860,556 A | 1/1999 | Robbins, III |
| 5,887,739 A | 3/1999 | Prevot et al. |
| 5,888,598 A | 3/1999 | Brewster et al. |

| | | | | | | |
|---|---|---|---|---|---|---|
| 5,897,090 A | 4/1999 | Smith et al. | | 2007/0235905 A1 | 10/2007 | Trude et al. |
| 5,906,286 A | 5/1999 | Matsuno et al. | | 2008/0047964 A1 | 2/2008 | Denner et al. |
| 5,908,128 A | 6/1999 | Krishnakumar et al. | | 2008/0156847 A1 | 7/2008 | Hawk et al. |
| D415,030 S | 10/1999 | Searle et al. | | 2009/0202766 A1 | 8/2009 | Beuerle et al. |
| 5,971,184 A | 10/1999 | Krishnakumar et al. | | | | |
| 5,976,653 A | 11/1999 | Collette et al. | | FOREIGN PATENT DOCUMENTS | | |
| RE36,639 E | 4/2000 | Okhai | | | | |
| 6,065,624 A | 5/2000 | Steinke | | DE | 1761753 | 1/1972 |
| 6,068,110 A | 5/2000 | Kumakiri et al. | | DE | P2102319.8 | 8/1972 |
| 6,074,596 A | 6/2000 | Jacquet | | DE | 3215866 A1 | 11/1983 |
| 6,077,554 A | 6/2000 | Wiemann et al. | | EP | 225155 A2 | 6/1987 |
| 6,105,815 A | 8/2000 | Mazda | | EP | 0 346 518 A1 | 12/1989 |
| 6,213,325 B1 | 4/2001 | Cheng et al. | | EP | 0521642 | 1/1993 |
| 6,217,818 B1 | 4/2001 | Collette et al. | | EP | 0 551 788 A1 | 7/1993 |
| 6,228,317 B1 | 5/2001 | Smith et al. | | EP | 0666222 A1 | 2/1994 |
| 6,230,912 B1 | 5/2001 | Rashid | | EP | 0 609 348 B1 | 2/1997 |
| 6,277,321 B1 | 8/2001 | Vailliencourt et al. | | EP | 0916406 A2 | 5/1999 |
| 6,298,638 B1 | 10/2001 | Bettle | | EP | 0957030 A2 | 11/1999 |
| 6,375,025 B1 | 4/2002 | Mooney | | EP | 1 063 076 A1 | 12/2000 |
| 6,390,316 B1 | 5/2002 | Mooney | | FR | 1571499 | 6/1969 |
| 6,413,466 B1 | 7/2002 | Boyd et al. | | FR | 2607109 | 5/1988 |
| 6,439,413 B1 | 8/2002 | Prevot et al. | | GB | 781103 | 8/1957 |
| 6,467,639 B2 | 10/2002 | Mooney | | GB | 1113988 | 5/1968 |
| 6,485,669 B1 | 11/2002 | Boyd et al. | | GB | 2050919 A | 1/1981 |
| 6,502,369 B1 | 1/2003 | Andison et al. | | GB | 2372977 A | 9/2002 |
| 6,514,451 B1 | 2/2003 | Boyd et al. | | JP | 48-31050 | 9/1973 |
| 6,585,124 B2 | 7/2003 | Boyd et al. | | JP | 49-28628 | 7/1974 |
| 6,595,380 B2 | 7/2003 | Silvers | | JP | 54-72181 A | 6/1979 |
| 6,612,451 B2 | 9/2003 | Tobias et al. | | JP | 56-72730 U | 6/1981 |
| 6,662,960 B2 | 12/2003 | Hong et al. | | JP | 57-210829 A | 1/1982 |
| 6,749,780 B2 | 6/2004 | Tobias | | JP | 57-37827 | 2/1982 |
| 6,763,968 B1 | 7/2004 | Boyd et al. | | JP | 63-189224 A | 8/1988 |
| 6,769,561 B2 | 8/2004 | Futral et al. | | JP | 3-43342 A | 2/1991 |
| 6,779,673 B2 | 8/2004 | Melrose et al. | | JP | 03-076625 A | 4/1991 |
| 6,923,334 B2 | 8/2005 | Melrose et al. | | JP | 5-193694 | 8/1993 |
| 6,942,116 B2 | 9/2005 | Lisch et al. | | JP | 6-336238 A | 12/1994 |
| 6,983,858 B2 | 1/2006 | Slat et al. | | JP | 07-300121 A | 11/1995 |
| 7,051,073 B1 | 5/2006 | Dutta | | JP | 8-253220 A | 10/1996 |
| 7,051,889 B2 | 5/2006 | Boukobza | | JP | 8-282633 A | 10/1996 |
| D522,368 S | 6/2006 | Darr et al. | | JP | 09-039934 A | 2/1997 |
| 7,073,675 B2 | 7/2006 | Trude | | JP | 9-110045 A | 4/1997 |
| 7,077,279 B2 | 7/2006 | Melrose | | JP | 10-167226 A | 6/1998 |
| 7,137,520 B1 | 11/2006 | Melrose | | JP | 10181734 A | 7/1998 |
| 7,150,372 B2 | 12/2006 | Lisch et al. | | JP | 10230919 A | 9/1998 |
| 7,159,374 B2 | 1/2007 | Abercrombie, III et al. | | JP | 11-218537 A | 8/1999 |
| 7,543,713 B2 | 6/2009 | Trude et al. | | JP | 2000229615 | 8/2000 |
| 7,735,304 B2 | 6/2010 | Kelley et al. | | JP | 2002-127237 A | 5/2002 |
| 7,799,264 B2 | 9/2010 | Trude | | JP | 2004-026307 A | 1/2004 |
| 2001/0035391 A1 | 11/2001 | Young et al. | | JP | 2006-501109 | 1/2006 |
| 2002/0074336 A1 | 6/2002 | Silvers | | JP | 2007-216981 A | 8/2007 |
| 2002/0096486 A1 | 7/2002 | Bourque et al. | | NZ | 240448 | 6/1995 |
| 2002/0153343 A1 | 10/2002 | Tobias et al. | | NZ | 296014 | 10/1998 |
| 2002/0158038 A1 | 10/2002 | Heisel et al. | | NZ | 335565 | 10/1999 |
| 2003/0015491 A1 | 1/2003 | Melrose et al. | | NZ | 506684 | 9/2001 |
| 2003/0186006 A1 | 10/2003 | Schmidt et al. | | NZ | 512423 | 9/2001 |
| 2003/0196926 A1 | 10/2003 | Tobias et al. | | NZ | 521694 | 10/2003 |
| 2003/0217947 A1 | 11/2003 | Ishikawa et al. | | WO | WO 93/09031 A1 | 5/1993 |
| 2004/0016716 A1 | 1/2004 | Melrose et al. | | WO | WO 93/12975 A1 | 7/1993 |
| 2004/0074864 A1 | 4/2004 | Melrose et al. | | WO | WO 94/05555 | 3/1994 |
| 2004/0149677 A1 | 8/2004 | Slat et al. | | WO | WO 97/03885 | 2/1997 |
| 2004/0173565 A1 | 9/2004 | Semersky et al. | | WO | WO 97/14617 | 4/1997 |
| 2004/0211746 A1 | 10/2004 | Trude | | WO | WO 97/34808 A1 | 9/1997 |
| 2005/0211662 A1 | 9/2005 | Eaton et al. | | WO | WO 99/21770 | 5/1999 |
| 2006/0006133 A1 | 1/2006 | Lisch et al. | | WO | WO 00/38902 A1 | 7/2000 |
| 2006/0138074 A1 | 6/2006 | Melrose | | WO | WO 00/51895 A1 | 9/2000 |
| 2006/0231985 A1 | 10/2006 | Kelley | | WO | WO 01/40081 A1 | 6/2001 |
| 2006/0243698 A1 | 11/2006 | Melrose | | WO | WO 02/02418 A1 | 1/2002 |
| 2006/0255005 A1 | 11/2006 | Melrose et al. | | WO | WO 02/18213 A1 | 3/2002 |
| 2006/0261031 A1 | 11/2006 | Melrose | | WO | WO 02/085755 A1 | 10/2002 |
| 2007/0017892 A1 | 1/2007 | Melrose | | WO | WO 2004/028910 A1 | 4/2004 |
| 2007/0045312 A1 | 3/2007 | Abercrombie, III et al. | | WO | WO 2004/106176 A2 | 9/2004 |
| 2007/0051073 A1 | 3/2007 | Kelley et al. | | WO | WO 2004/106175 A1 | 12/2004 |
| 2007/0084821 A1 | 4/2007 | Bysick et al. | | WO | WO 2005/012091 A2 | 2/2005 |
| 2007/0125742 A1 | 6/2007 | Simpson, Jr. et al. | | WO | WO 2005/087628 A1 | 9/2005 |
| 2007/0125743 A1 | 6/2007 | Pritchett, Jr. et al. | | WO | WO 2006/113428 A3 | 10/2006 |
| 2007/0181403 A1 | 8/2007 | Sheets et al. | | WO | WO 2007/127337 A2 | 11/2007 |
| 2007/0199915 A1 | 8/2007 | Denner et al. | | | | |
| 2007/0199916 A1 | 8/2007 | Denner et al. | | | | |
| 2007/0215571 A1 | 9/2007 | Trude | | | | |

OTHER PUBLICATIONS

Office Action dated Feb. 8, 2010 for U.S. Appl. No. 12/250,856.
Chanda, M. & Roy, Salil K., Plastics Technology Handbook, 2007, CRC Press, pp. 2-34-2-37.
IPRP (including Written Opinion) for PCT/US2005/008374 dated Sep. 13, 2006.
International Search Report for PCT/2004/024581 dated Jul. 25, 2005.
IPRP (including Written Opinion) for PCT/2004/024581 dated Jan. 30, 2006.
International Search Report for PCT/US2006/040361 dated Feb. 26, 2007.
IPRP (including Written Opinion) for PCT/US2006/040361 dated Apr. 16, 2008.
International Search Report for PCT/US2006/014055 dated Dec. 7, 2006.
IPRP (including Written Opinion) for PCT/US2006/014055 dated Oct. 16, 2007.
International Search Report for PCT/US2007/006318 dated Sep. 11, 2007.
IPRP (including Written Opinion) for PCT/US2007/006318 dated Sep. 16, 2008.
U.S. Appl. No. 60/220,326, filed Jul. 24, 2000.
Final Office Action for U.S. Appl. No. 10/558,284 dated Sep. 9, 2008.
Office Action for U.S. Appl. No. 10/558,284 dated Jan. 25, 2008.
Office Action for U.S. Appl. No. 10/566,294 dated Oct. 27, 2008.
Final Office Action for U.S. Appl. No. 10/566,294 dated Feb. 13, 2009.
Office Action for U.S. Appl. No. 10/851,083 dated Nov. 28, 2008.
Final Office Action for U.S. Appl. No. 10/851,083 dated Jun. 12, 2008.
Office Action for U.S. Appl. No. 10/851,083 dated Sep. 6, 2007.
International Search Report for PCT/US2004/016405 dated Feb. 15, 2005.
IPRP (including Written Opinion) for PCT/US2004/016405 dated Nov. 25, 2005.
"Application and Development of PET Plastic Bottle," Publication of Tsinghad Tongfang Optical Disc Co. Ltd., Issue 4, 2000, p. 41. (No English language translation available).
International Search Report for PCT/US2005/008374 dated Aug. 2, 2005.
Final Office Action dated Jan. 14, 2011, U.S. Appl. No. 11/704,368.
Office Action dated Jul. 8, 2010, U.S. Appl. No. 11/704,368.
Office Action dated Jun. 28, 2010, U.S. Appl. No. 12/244,041.
Office Action dated Apr. 14, 2010, U.S. Appl. No. 12/244,041.
Final Office Action dated Jun. 17, 2010, U.S. Appl. No. 12/250,856.
Office Action dated Feb. 8, 2010, U.S. Appl. No. 12/250,856.
Office Action dated Oct. 30, 2009, U.S. Appl. No. 12/250,856.
Final Office Action dated Dec. 30, 2010, U.S. Appl. No. 12/406,491.
Office Action dated Aug. 24, 2010, U.S. Appl. No. 12/406,491.
Office Action dated Jan. 26, 2011, U.S. Appl. No. 12/792,320.
International Search Report and Written Opinion dated Mar. 15, 2010 for PCT/US2010/020045.
International Search Report and Written Opinion dated Sep. 8, 2009 for PCT/US2009/051023.
Office Action dated Jul. 26, 2010, Canadian Application No. 2,527,001.

MULTI-FUNCTIONAL BASE FOR A PLASTIC, WIDE-MOUTH, BLOW-MOLDED CONTAINER

CROSS-REFERENCE TO RELATED APPLICATIONS

The present application is a continuation of U.S. patent application Ser. No. 10/851,083 (U.S. Pat. Pub. No. 2004/0211746) filed May 24, 2004, now U.S. Pat. No. 7,543,713 which is a continuation-in-part of U.S. patent application Ser. No. 10/444,616 (U.S. Pat. Pub. No. 2003/0196926) (abandoned) filed on May 23, 2003, which is a continuation-in-part of U.S. patent application Ser. No. 10/124,734 filed on Apr. 17, 2002, now U.S. Pat. No. 6,612,451, which claims the benefit of priority of U.S. Provisional Patent Application No. 60/284,795 filed on Apr. 19, 2001. Additionally, PCT application PCT/US2004/016405 filed May 24, 2004 also claims priority to U.S. patent application Ser. No. 10/444,616 (U.S. Pat. Pub. No. 2003/0196926) (abandoned). The contents of each of the foregoing are incorporated by reference in their entirety.

FIELD OF THE INVENTION

The present invention relates to a base for a wide mouth blow-molded plastic container, and more particularly, the present invention relates to a multi-functional base structure which enables use of the container in hot-fill, as well as pasteurization/retort processing.

BACKGROUND OF THE INVENTION

Plastic blow-molded containers, particularly those molded of PET, have been utilized in hot fill applications where the container is filled with a liquid product heated to a temperature in excess of 180° F. (82° C.), capped immediately after filling, and allowed to cool to ambient temperatures. Plastic blow-molded containers have also been utilized in pasteurization and retort processes, where a filled and sealed container is subjected to thermal processing and is then cooled to ambient temperatures. Pasteurization and retort methods are frequently used for sterilizing solid or semi-solid food products, e.g., pickles and sauerkraut, which may be packed into the container along with a liquid at a temperature less than 82° C. (180° F.) and then heated, or the product placed in the container that is then filled with liquid, which may have been previously heated, and the entire contents subsequently heated to a higher temperature. Pasteurization and retort differ from hot-fill processing by including heating the contents of a filled container to a specified temperature, typically greater than 93° C. (200° F.), until the contents reach a specified temperature, for example 80° C. (175° F.), for a predetermined length of time. Retort processes also involve applying overpressure to the container. In each of these cases, the plastic containers are typically provided with vacuum absorption panels to accommodate volumetric changes in the container as the contents of the sealed container are heated and/or as the contents cool within the sealed container.

U.S. Pat. No. 6,439,413 issued to Prevot et al. and assigned to Graham Packaging Company, L.P. discloses a hot-fillable and retortable plastic wide-mouth blow-molded container having a sidewall with a pair of flex panels.

Co-pending U.S. patent application Ser. No. 10/129,885 filed on May 10, 2002 is the U.S. national phase of International Application No. PCT/US00/31834 is assigned to Graham Packaging Company, L.P., and discloses a pasteurizable wide-mouth container having a novel base.

Other plastic wide-mouth containers having paneled sidewalls are disclosed in U.S. Pat. No. 5,887,739 issued to Prevot et al.; U.S. Pat. No. 5,261,544 issued to Weaver, Jr.; and U.S. Pat. No. 5,092,474 issued to Leigner. A pasteurizable plastic container having paneled sidewalls and a narrow neck finish is disclosed by U.S. Pat. No. 5,908,128 issued to Krislmakumar et al.

Containers having non-paneled sidewalls and yieldable endwall structures are disclosed in U.S. Pat. Nos. 4,642,968, 4,667,454 and 4,880,129 issued to McHenry et al.; U.S. Pat. No. 5,217,737 issued to Gygax et al.; U.S. Pat. No. 5,234,126 issued to Jonas et al.; U.S. Pat. No. 4,381,061 issued to Cerny et al.; U.S. Pat. No. 4,125,632 issued to Vosti et al.; and U.S. Pat. No. 3,409,167 issued to Blanchard. The above cited U.S. patents disclose containers having various base structures.

The structure of a so-called footed base is disclosed, in general, in U.S. Pat. No. 4,355,728 issued to Yoshino et al., U.S. Pat. No. 5,713,480 issued to Petre et al., U.S. Pat. No. 3,727,783 issued to Carmichael, U.S. Pat. No. 4,318,489 issued to Snyder et al., U.S. Pat. No. 5,133,468 issued to Brunson et al., U.S. Pat. No. 5,024,340 issued to Alberghini et al., U.S. Pat. No. 3,935,955 issued to Das, U.S. Pat. Nos. 4,892,205, 4,867,323 and Re. 35,140 issued to Powers et al., and U.S. Pat. No. 5,785,197 issued to Slat.

U.S. Pat. No. 4,321,483 issued to Dechenne et al. discloses a base having slightly angled annular surface and a central conical projection; and U.S. Pat. No. 4,386,701 issued to Galer discloses a blow molded plastic drum having a base which is designed to stack efficiently with the lid of a like drum.

Plastic containers, including those described in the above-mentioned references, containers, including containers designed for use in hot-fill processing. There remains a need to provide plastic containers that can withstand the rigors of pasteurization and retort processing in order to take advantage of the cost savings that can be realized through manufacture and recycling. The lighter weight of plastic containers as compared to glass can also advantageously reduce shipping costs.

Published International Application No. WO 02/02418 describes a container with a base that can be capable of withstanding the rigors of the pasteurization process. The base includes a large push up section formed with a sharp transition to the container sidewall. The base also must be heat set to a relatively high crystallinity.

While the above referenced containers and base structures may function satisfactorily for their intended purposes, there is a need for a plastic, wide-mouth, blow-molded container which is particularly suited for packaging a variety of viscous and other food products and which has a novel base structure that enables the container to be utilized in hot-fill, pasteurization and retort processes. The base structure should be capable of accommodating increased internal pressure experienced during pasteurization; capable of accommodating vacuum formed in the sealed container during cool down; and capable of resisting unwanted inversion, ovalization or like deformation. A container capable of efficient stacking with like containers is also desirable.

SUMMARY OF THE INVENTION

With the foregoing in mind, an object of the present invention is to provide a commercially satisfactory wide-mouth blow-molded container that can be utilized in hot-fill applications, as well as for pasteurization or retort applications used in for packaging fluent, viscous and solid food products.

Another object of the present invention is to provide a base structure capable of accommodating an increase in internal container pressure when the sealed container is subjected to thermal treatment, and capable of accommodating vacuum during cool down.

Still another object of the present invention is to provide a hot-fillable and pasteurizable container having a base which accommodates changes in internal pressure and volume and which resists unwanted inversion and other deformation.

A further object of the present invention is to provide a structure for a wide-mouth plastic container which can be efficiently stacked, one on top of the other, with like containers and which can be produced by means of high speed manufacturing equipment in an economical manner that ensures consistent quality and performance.

More specifically, the present invention provides a blow molded plastic container having a base with a continuous or discontinuous concave outer annular wall having an outer portion and an inner portion forming a standing ring therebetween. The base also includes an inner annular wall that extends within the outer annular wall and above the standing ring. The inner periphery of the inner annular wall is made of blow molded plastic material that is heat-set and biaxially-oriented and connects to an anti-inverting central dimple. Functionally, the inner annular wall is capable of flexing upwardly and downwardly in response to variations in pressures in a filled and sealed container without undergoing unwanted permanent deformation. In addition, preferably a shoulder extends radially inward on the inner portion of the outer annular wall above a level of the standing ring to facilitate vertical stacking of containers having like bases.

In a particular embodiment, the container includes a body having an integrally formed base that includes a concave annular wall extending from a sidewall of the container to a standing surface, an inner wall that is substantially perpendicular to the sidewall and extends from the standing surface to a substantially flat inner annular wall. The concave annular wall can be continuous. A dimple is centrally located within the inner annular wall and includes a plurality of spaced apart radially extending indented ribs. Each rib has a brace that extends radially from the dimple and tapers to meet the inner annular wall. The ribs can also include a rib wall; and a brace ledge tapering from the rib wall to the inner annular wall, a rib wall; and a brace ledge tapering from said rib wall to the inner annular wall. A brace sidewall extending from said brace ledge to said inner annular wall.

The container can be made of a blow molded plastic material, and the degree of crystallinity of the plastic material in the base is greater than the degree of crystallinity of the plastic material in the sidewall. The degree crystallinity in the base can be greater than 20% an can be less than 30%. The sidewall diameter can be no more than 50% greater than the inner diameter of the standing surface.

The inner annular wall of the base is adapted to flex upwardly and downwardly in response to variations in pressures within the container, when capped and filled, without undergoing unwanted permanent deformation.

The invention is also a method of improving resistance to base deformation in a blow molded plastic container comprising forming a concave annular wall extending from an extremity of the base to a standing surface, forming an inner wall extending from the standing surface to a substantially flat inner annular wall that is substantially perpendicular to the sidewall; and forming a centrally located dimple within the inner annular wall and a plurality of spaced apart radially extending indented ribs, each of the ribs comprising a brace extending radially from the dimple and tapering to meet the inner annular wall.

BRIEF DESCRIPTION OF THE DRAWINGS

The foregoing and other objects, features and advantages of the present invention should become apparent from the following description when taken in conjunction with the accompanying drawings, in which.

DETAILED DESCRIPTION OF THE INVENTION

Figure 1:
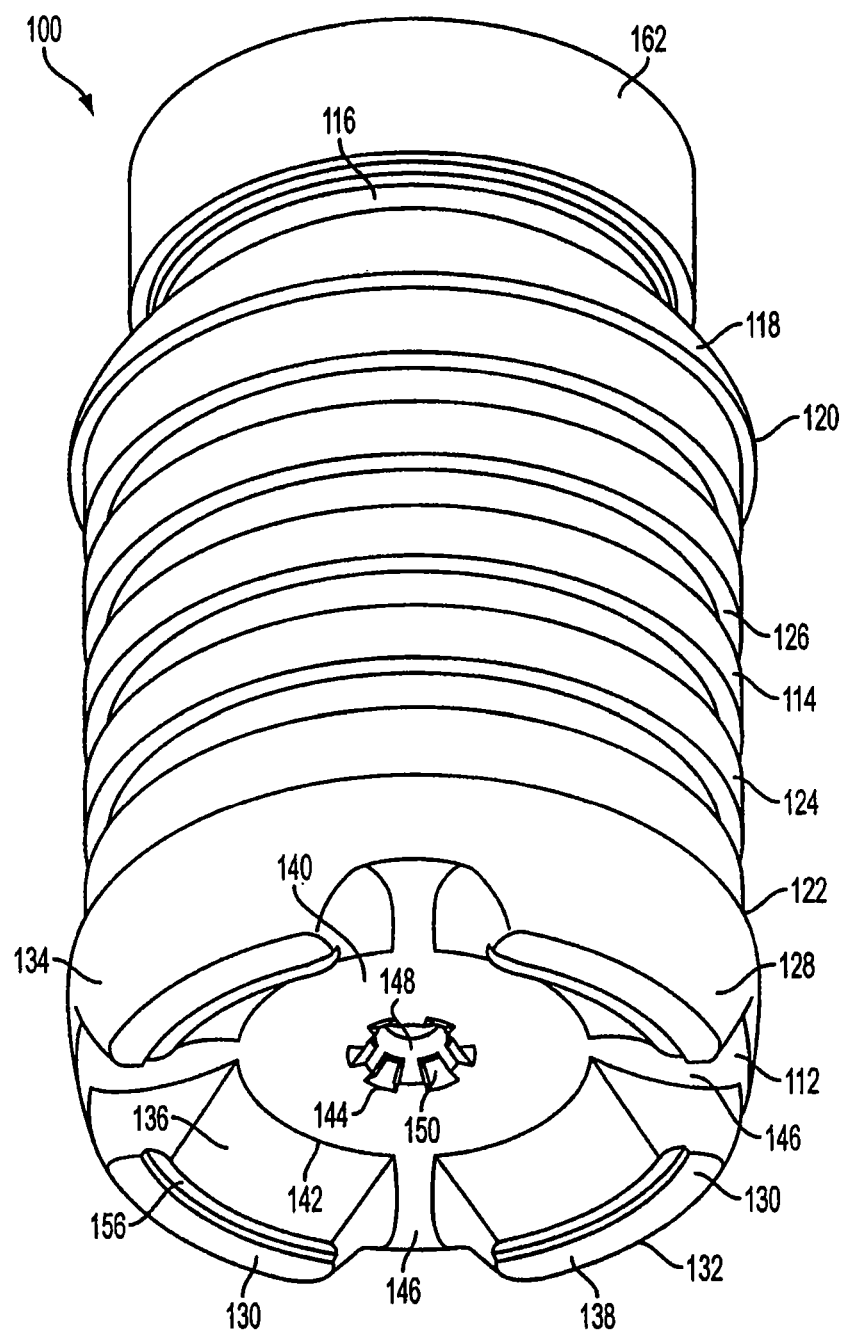
FIG. 1 is a perspective view of a container having a base according to an embodiment of the present invention.
Figure 2:
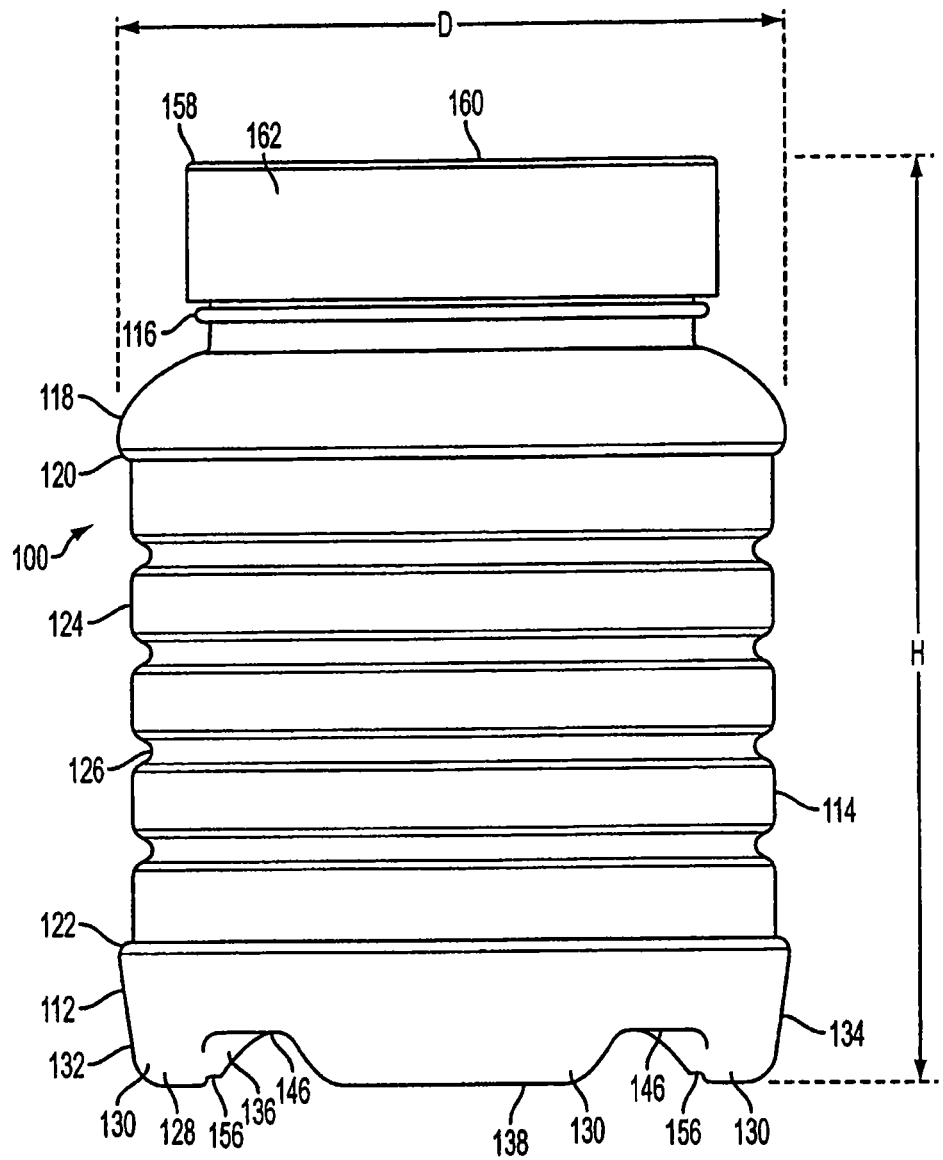
FIG. 2 is an elevational view of the container illustrated in FIG. 1.
Figure 3:
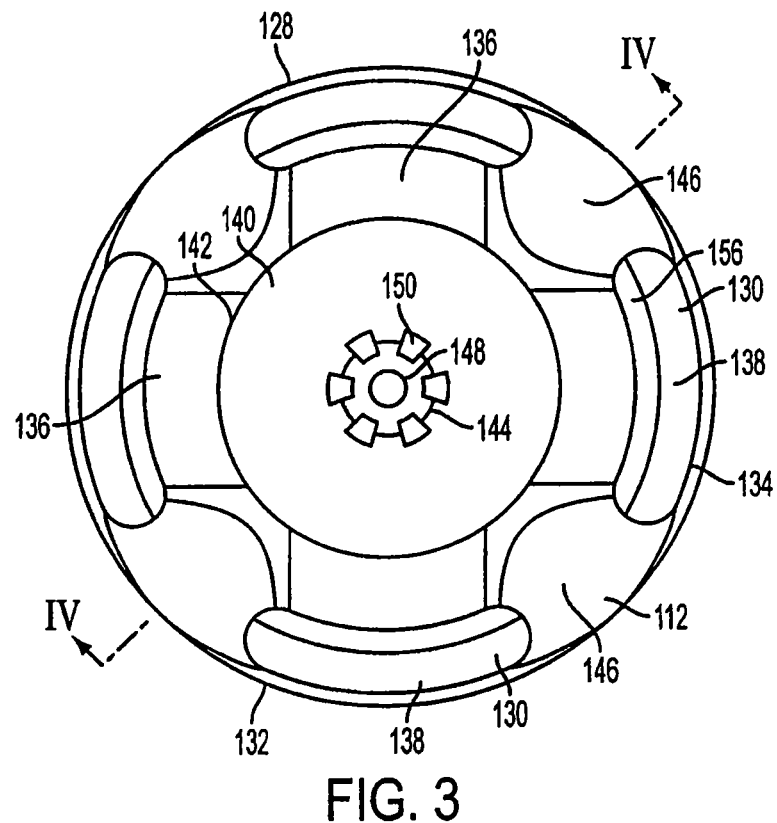
FIG. 3 is bottom plan view of the base illustrated in FIG. 1.
Figure 4:
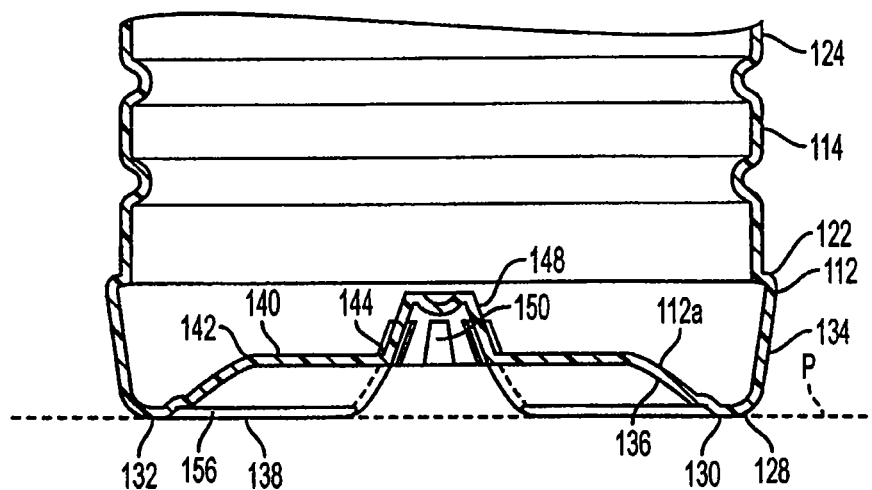
FIG. 4 is a cross-sectional view of the base taken along line IV-IV of FIG. 3.
Figure 5:
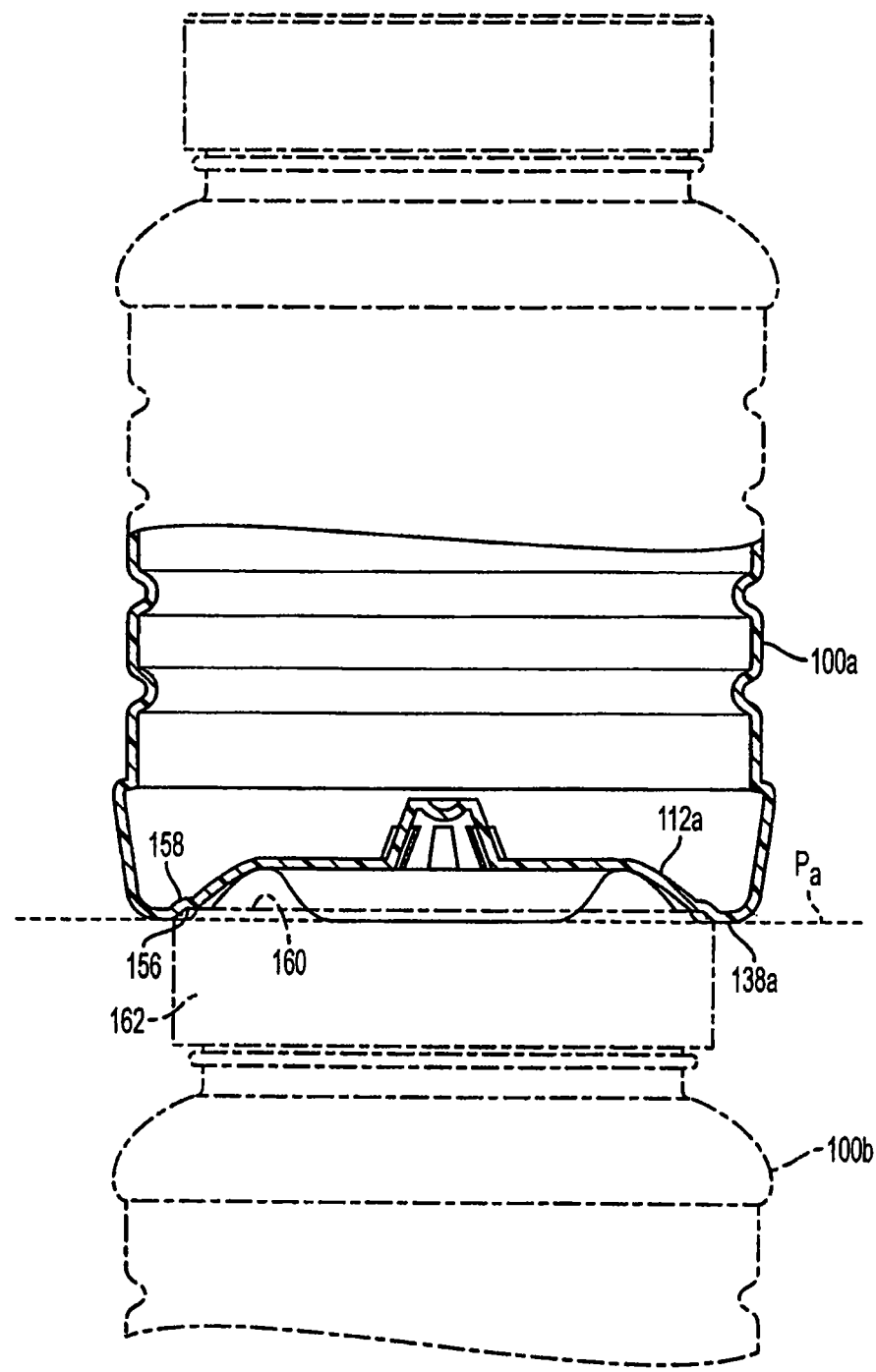
FIG. 5 is a cross-sectional view of the base taken along line V-V of FIG. 2 and illustrates a pair of containers in a stacked arrangement.
Figure 6:
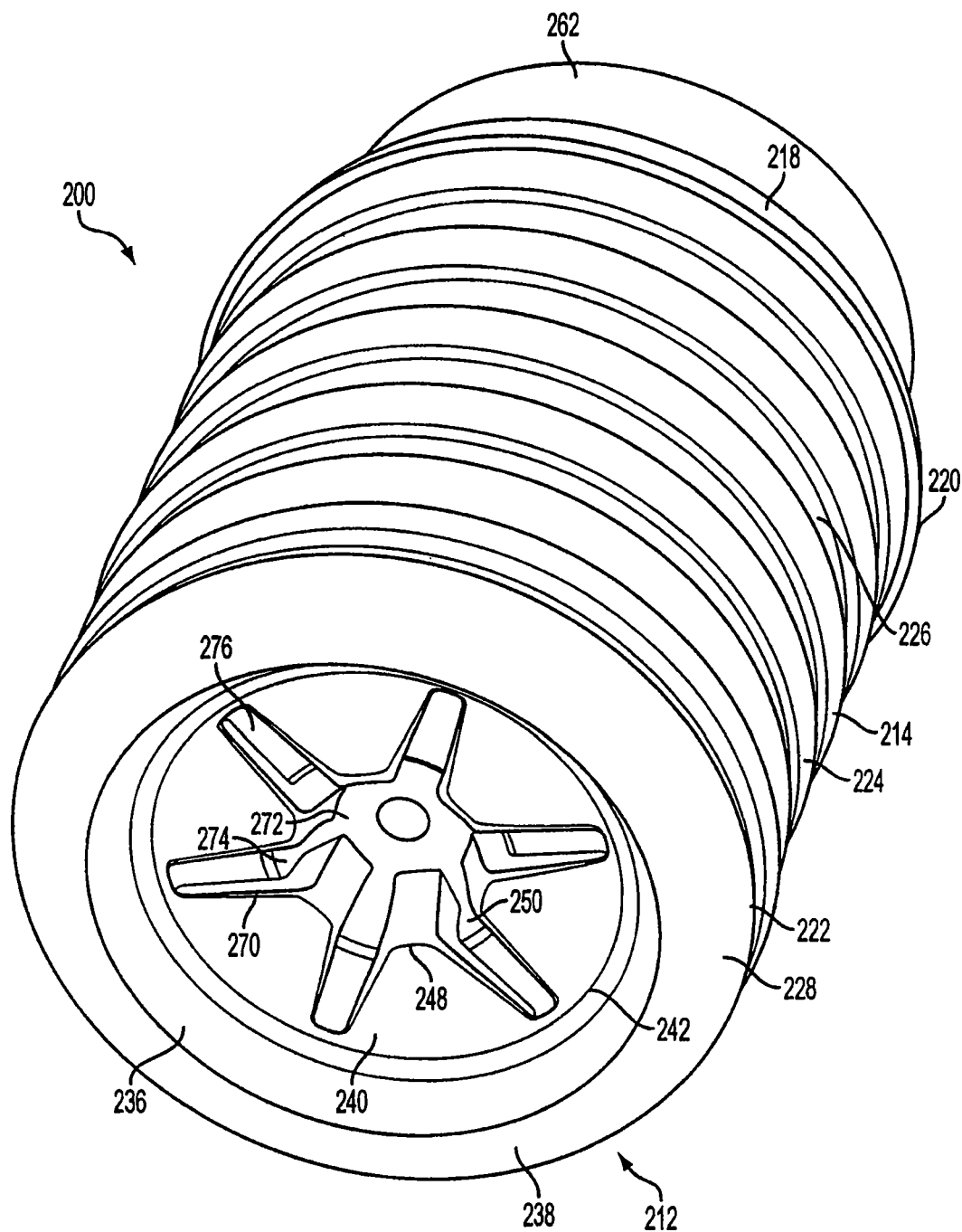
FIG. 6 is a perspective view of a container having a base according to another embodiment of the invention.
Figure 7:
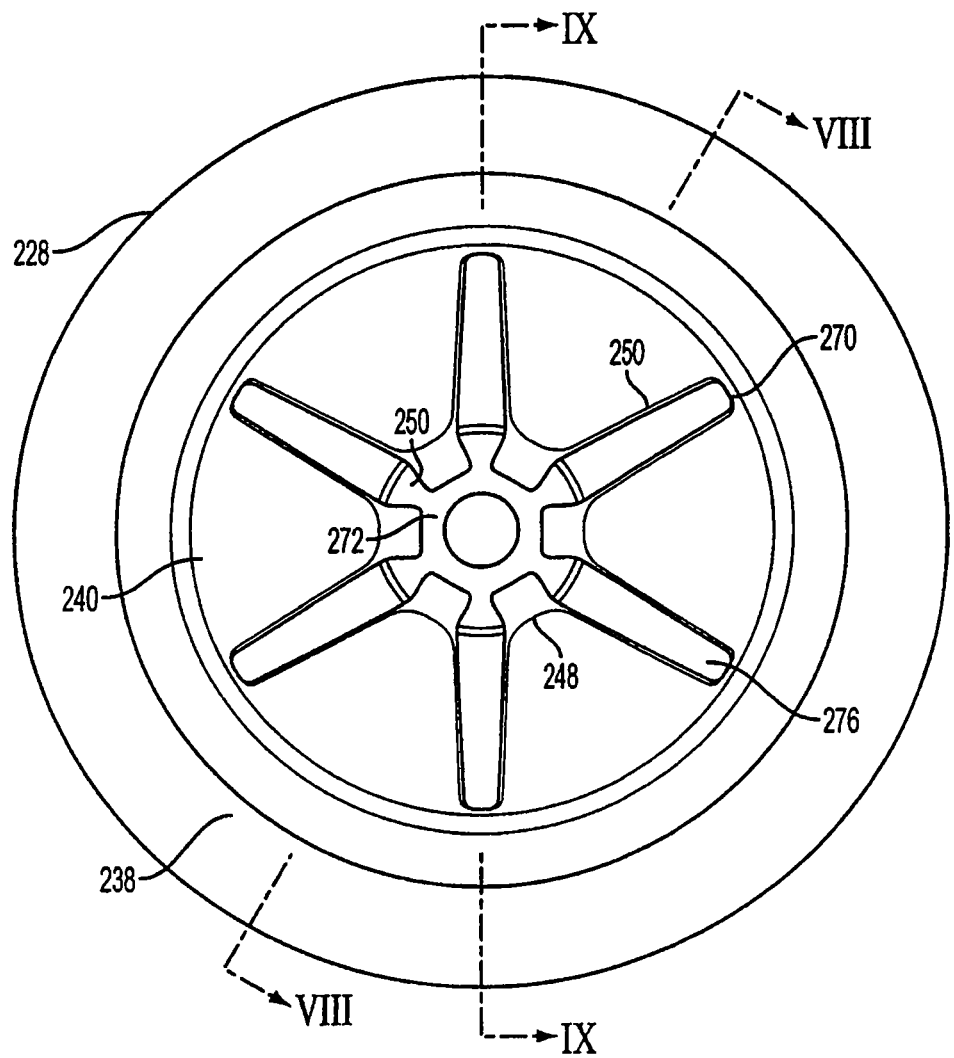
FIG. 7 is a bottom view of the base according to the embodiment illustrated in FIG. 6.
Figure 8:
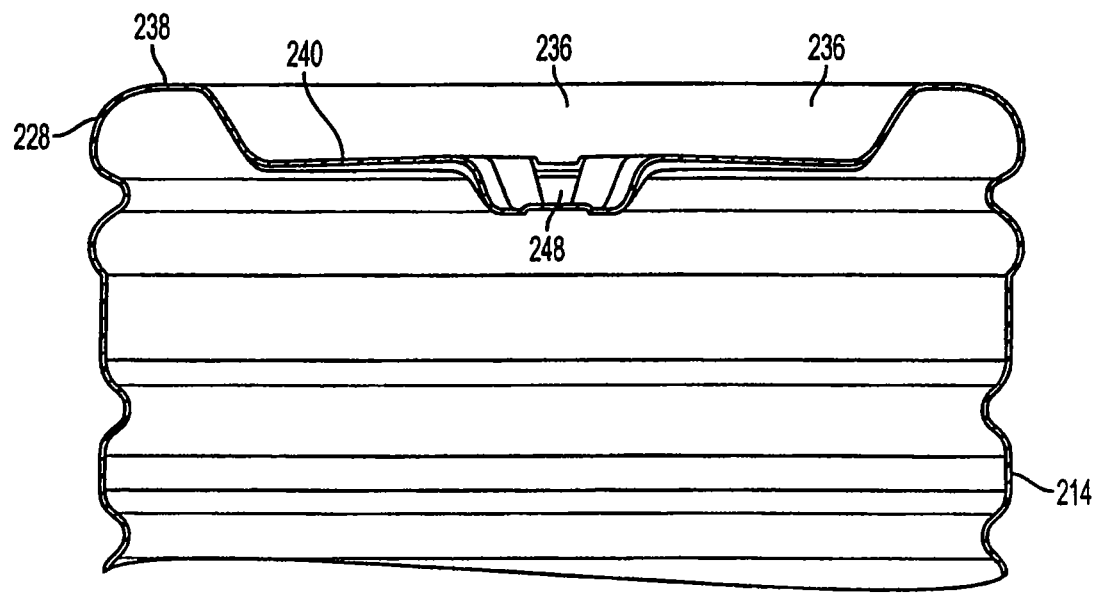
FIG. 8 is a cross-section of the base of FIG. 6 taken along the VIII-VIII line of FIG. 7.

An embodiment of the present invention is illustrated in FIGS. 1-5 as container 100. Container 100 has a base 112, a tubular sidewall 114, and a wide-mouth threaded finish 116 which projects from the upper end of the sidewall 114 via a shoulder 118. In the illustrated embodiment, upper and lower label bumpers, 120 and 122, are located adjacent the shoulder 118 and base 112, respectfully, and outline a substantially cylindrical label area 124 on the sidewall 114. Containers according to the invention can have cross-sectional shapes other than circular. In addition, the sidewall 114 can have a series of circumferential grooves 126 which reinforce the sidewall 114 and resist paneling, dents and other unwanted deformation of the sidewall 114.

The container 100 is multi-functional since it can be utilized in hot-fill as well as pasteurization and retort processing. To accomplish this objective, the base 112 has a structure which is capable of accommodating elevated internal container pressure experienced during pasteurization or retort processing, and which is capable of accommodating reduced container volume and pressure experienced upon cool down of a filled and sealed container after hot-fill, pasteurization or retort processing. To this end, the base 112 can flex downwardly in a controlled manner and to a desired extent when pressure within the filled and sealed container is elevated, and the base 112 can flex upwardly in a controlled manner and to a desired extent when a vacuum develops within the filled and sealed container.

Structurally, the base 112 includes a concave outer annular wall 128 that is either continuous or discontinuous. FIGS. 1-5 illustrate an embodiment of the base 112 having a discontinuous concave outer annular wall 128 that provides a plurality of spaced-apart, arcuate supports 130 adjacent the outer periphery 132 of the base 112. Each support 130 has an outer wall portion 134 that extends upwardly toward the lower label bumper 122 and an inner wall portion 136 that extends upwardly and inwardly into the remaining base structure as will be discussed. A standing surface 138 is formed at the juncture of each outer and inner wall portions, 134 and 136, thereby forming a discontinuous support ring of the container 100. FIGS. 6-9 illustrate an embodiment of a base 212 having a continuous concave outer annular wall 228 that forms a continuous standing surface 238, as described more fully below.

An inner annular wall 140 of base 112 extends within the concave outer annular wall 128. The inner annular wall 140 has an outer periphery 142 and an inner periphery 144. The outer periphery 142 of the inner annular wall 140 merges with the inner wall portion 136 of each of the supports 130 and, in the illustrated embodiment, with a plurality of spaced-apart, horizontally-disposed, radial webs 146 located adjacent the outer periphery 132 of the base 112. Each of the webs 146 extends between the supports 130 and connects to the container sidewall 114 at an elevation above the horizontal plane "P" extending through the standing surface 138. In an embodiment of the present invention in which the concave outer annular wall 128 is continuous, webs 146 are not provided. The inner periphery 144 of the inner annular wall 140 merges into an anti-inverting central dimple 148.

The inner annular wall 140 functions as a flex panel. To this end, when the internal pressure increases within a filled and sealed container, the inner annular wall 140 flexes downwardly to accommodate the increased pressure and to prevent the sidewall 114 of the container 100 from undergoing unwanted permanent distortion. In addition, the inner annular wall 140 flexes upwardly to relieve vacuum when the contents of a hot filled and capped container, or a filled, capped and subsequently pasteurized container, cool to ambient. Thus, when the sealed container and contents cool to ambient temperature, the sidewall 114 is substantially unchanged from its as-formed shape and is capable of neatly supporting a wrap-around label without unwanted voids or the like beneath the label. In addition, the sidewall 114 resists ovalization and the base 112 provides a level seating surface which is not subject to rocking or the like.

The base 112 of container 100 is specifically designed to provide flexural movement. Increasing flexure of the base 112 is accomplished by providing a larger circular flat between the dimple 148 and the arcuate supports 130. Thus, the inner annular wall 140 of container 100 is relatively large compared to other containers of a similar size. To this end, the diameter, size, or extent of the central dimple 148 is reduced and the inner diameter of the arcuate supports 130 is increased relative to prior art container.

The relatively large flat surface provided by inner annular wall 140 provides greater flexure; however, it can also be more prone to "roll out", i.e. becoming permanently deformed in an outwardly projecting position when its contents are hot-filled or heated at relatively high temperatures, such as those encountered during pasteurization or retort processing. This is because an amorphous ring of material is created at the interconnection of the inner periphery 144 of the inner annular wall 140 and the dimple 148 due to the reduced size of the dimple 148. This ring of un oriented, non heat-set material provides a weakened area that permits the base to "roll out" when filled and sealed with contents at high temperatures.

The base 112 of the present invention overcomes the "roll out" problem by providing a series of spaced-apart, radially-extending, hollow, indented ribs 150 in the dimple 148 where the inner periphery 144 of the inner annular wall 140 interconnects to the central dimple 148. The structure provided by the ribs 150 causes the material in this region to be stretched during blow molding of the container 100 so that the ring of material adjacent the interconnection of the dimple 148 and inner annular wall 140 is both heat-set and the extent of biaxial orientation increased to structurally reinforce the base and prevent "roll out" of the base 112. If desired, the dimple 148 can be indented to a given extent into the container 100 to provide additional stretching, and the total number of ribs 150 can be three or more, such as six as illustrated in FIG. 1. In addition, the shape and size of the ribs can vary as long as the blow molded plastic material forming the base at the interconnection of the dimple 148 and inner annular wall 140 has sufficiently increased biaxial orientation and is heat-set by heated surfaces of a blow mold.

Thus, the inner annular wall 140 flexes downwardly when the container is filled, capped and subjected to an increase in pressure within the container. However, complete inversion and failure is prevented by the reinforcement ribs 150 formed in the dimple 148, which travel with the inner annular wall 140. The ribs 150 and dimple 148 maintain a substantially constant shape regardless of the internal pressure experienced within the container, due to the increase in density and stiffness resulting from the increased orientation.

Another feature of the base 112 of the present invention is that each inner wall portion 136 of the arcuate supports 130 can have an arcuate shoulder, or support ridge, 156 formed therein and spaced in elevation from both the support surfaces 138 and the inner annular wall 140 to facilitate vertical stacking of like containers 100. For example, as illustrated FIG. 5, an upper container 100a can be stacked on a lower container 100b. The support ridge 156 in the base 112a of the upper container 100a seats on the outer edge 158 of the upper surface 160 of the lid 162 of the lower container 100b such that the horizontal plane "$P_a$" extending through the standing surfaces 138a of the upper container 100a extends a spaced distance beneath the top surface 160 of the lid 162 of the lower container 100b.

By way of example, and not by way of limitation, the container 100 according to the present invention preferably has a height "H" of about 5.8 inches, a container outermost diameter "D" of about 4.2 inches, and can contain a capacity of about 32 fluid ounces. The discontinuous standing ring formed by the standing surfaces 38 has a diameter of about 3.7 inches, and the inner annular wall 140 of the base 112 has an inner periphery 144 with a diameter of less than about 1.25 inches and an outer periphery 142 with a diameter of at least about 2.5 inches. The radial webs 146 are uniformly spaced apart and separate each support 130 such that each support 130 is at least about 0.8 radians. In addition, each support 130 has a larger arcuate extent than that of each radial web 146.

FIGS. 6-9 illustrate a second embodiment of a base 212 that may be used on a container 200 according to the present invention. Other than the base 212, the container 200 can be the same as or different from container 100. Accordingly, the last two digits in reference numerals used to designate features of the container 200 are the same as the reference numerals that are used to designate the related features in container 100. For example, the container 200 can include a threaded finish 216 that can be the same as the threaded finish 116 of the first embodiment, and can accommodate a closure 262 having complementary threads. Similarly, the shoulder 218, upper bumper 220, circumferential grooves 226, label area 224, and sidewall 214 can be structurally similar to the corresponding features of the first embodiment.

The second embodiment of the base 212 includes a continuous concave outer annular sidewall 228. The outer portion 228 of the annular sidewall curves from the sidewall 214 toward the center of the container 200 to form a continuous standing surface 238. The standing surface 238 is formed as a continuous, circular surface. Further, the transition from the outer annular sidewall 228 to the standing surface 238 is gradual and continuous. An inner portion 236 of the outer annular sidewall extends from the standing surface 238 to a substantially flat inner annular wall 240. The outer periphery 242 of the inner annular wall 240 forms a continuous ring around the inner annular wall 240.

Approximately centrally located on the inner annular wall 240 is a dimple 248. Extending outwardly from the dimple 248 are a series of ribs 250. The dimple 248 of this embodiment can be substantially the same size as the dimple 148 in the first embodiment 100, or can be slightly larger. The ribs 250 of the second embodiment extend outwardly to form a series of radially placed braces 270, which taper to an elevation that meets the flat inner annular wall 240 before, near, or the outer periphery 242 of the inner annular wall. In the illustrated embodiment, the ribs 250 first extend outward from the dimple at a similar depth to the inner portion 272 of the dimple to a rib wall 274, where there is a relatively abrupt change in depth toward the inner annular wall 240. The rib wall 274 extends up to a brace ledge 276 which slopes towards the surface of the inner annular wall 240. The brace ledge 276 can meet the surface of the inner annular wall 240 at or before the outer periphery 242. The sidewall of the brace 278 extends upward from the brace ledge 276 to the surface of the inner annular wall 240. The brace sidewall 278 meets the inner annular wall 240 at a periphery of the brace 270. The sidewall of the brace 278 can be substantially perpendicular to the inner annular wall 240 and the brace ledge 276.

The inner annular wall 240 in base 212 flexes in a manner analogous to the inner annular wall 140 of base 112. The radially spaced braces 270 further control flexure of the annular wall 240 in response to the reduced pressures that occur when the container cools down during hot-fill processing, and the reduced and increased pressures that occur during pasteurization and retort processing. The presence of the braces 270 allows greater flexure of the inner annular wall 240 within the concave outer annular wall 228 without allowing permanent deformation of the base. In addition, the presence of a continuous outer annular wall 228 is useful during rigorous pasteurization or retort conditions. Under such conditions, a discontinuous outer sidewall that has feet can have a tendency for the feet to pull in, causing the lower bumper to move into a square shape. By having a continuous standing surface 238 and a continuous outer annular sidewall 228, this tendency is reduced. Further, the presence of a continuous standing surface 238 alleviates any tendency for excessive base rollout.

The base structure described herein is illustrated without a support ridge 156 (see FIGS. 1-5) for stacking of containers. Such a ridge or shoulder can, however, be readily incorporated into a base 242 according to this second embodiment of the invention.

The base 212 according to the present invention is preferably crystallized to some extent as previously described in the first embodiment. Some degree of crystallinity and biaxial orientation is achieved normally during the blow molding process. Crystallization can also be promoted through heat setting of the container. For example, the walls and base of the mold can be held at an elevated temperature to promote crystallization. When the container is heat set at a temperature of about 180° F., the container sidewalls, base, dome, and threads can be typically crystallized to about 20%. This degree of crystallinity is typical for a blow molding process and does not represent a significant amount of heat setting or increased crystallinity or orientation, as compared with a typically prepared container. However, the properties of the base of the present invention can be advantageously enhanced by heat setting the container, and particularly the base, at ever higher temperatures. Such temperatures can be, for example, greater than 250° F. and can be 325° F. or even higher. When these elevated heat set temperatures are utilized, crystallinity can be increased to greater than 20% or 25% or more. One drawback of increasing crystallinity and biaxial orientation in a plastic container is that this process introduces opacity into the normally clear material. However, unlike bases in prior art containers designed for use in pasteurization and retort processes, which can require a crystallinity of 30% or more, utilizing crystallinities of as low as 22-25% with a base structure according to the present invention can achieve significant structural integrity, while maintaining the substantial clarity of a base that is preferred by manufacturers, packagers and consumers of such pasteurized commodities. Crystallinities of 30% or greater that are frequently utilized in prior container to achieve significant structural integrity can cause undesirable opacity in the base region.

Bases formed with configurations according to the present invention provide a more appealing structure to consumers, packagers and manufacturers for other reasons, as well. For example, when switching from the use of glass to plastic in packaging such pasteurizable commodities, design changes cause undesirable changes in the internal container configuration. Typically, in order to withstand the rigors of pasteurization or retort processing, prior containers have included a base formed with a large central push-up, as is used in typical plastic containers used in hot-fill processes. This push-up limits the volume of material that can be placed in the container in the internal region between the push-up and the sidewalls. This can be particularly problematic when solid products, for example, pickles, are packaged. The presence of narrow channels which are formed between the sidewall and large base push-up in the internal space of a typical blow molded container, can limit the volume into which solid materials can be placed. That is, such designs create dead space within the container that can be filled by liquid, but not by the solid product. In traditional glass containers, a relatively flat bottom can be formed which allows solids to be packed throughout the vertical and radial extent of the container. Prior art plastic containers that have been utilized to withstand the pasteurization and retort conditions have used similar internal geometry, which creates dead space.

Figure 9:
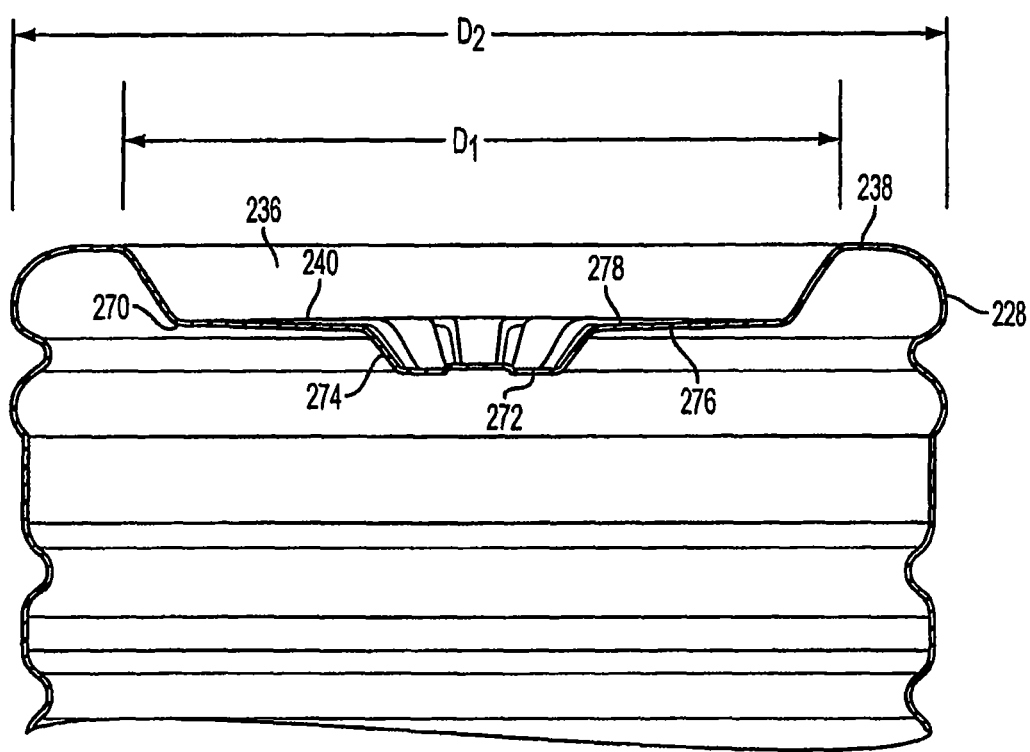
FIG. 9 is a cross-section of the base of FIG. 6 taken along the line IX-IX of FIG. 7.

According to the present invention, and particularly according to the second embodiment described herein, the configuration of the base can reduce the amount of dead space and be much more similar to traditionally used glass containers. For example, the substantially flat inner annular wall 240 can extend to a substantial outward extent toward the edge of the container. By using a base configuration according to the present invention, the inner diameter of the standing surface, i.e. the pushed-up region of the base $D_1$, as shown in FIG. 9, can be a relatively large portion of the container diameter $D_2$. According to the present invention, the ratio of the container diameter $D_2$ to the pushed-up diameter $D_1$ can be less than 1.5:1.0 and even 1.3:1.0 or lower. Stated differently, the diameter of the container $D_2$ can be less than 50% larger than, or as little as about 30% larger than, the diameter of $D_1$ of the pushed-up region. In cases where the container is not round, this corresponds to a projected volume of the sidewall region less than 70% greater than the projected area of the push-up region.

By way of example, and not by way of limitation, the container 200 according to the present invention can have dimensions similar to those of the container 100. For example, the container can have a height of about 5.8 inches, an outermost diameter $D_2$ of about 3.8 inches, and can contain a capacity of about 32 fluid ounces. The pushed-up region of the base can have a diameter $D_1$ of about 3.1 inches. The brace 270 can have a brace ledge 276 that extends out about 0.6 inches from the dimple 248. The distance between opposite rib walls 274 can be about 1.2 inches, while the distance across the dimple 248 in the region between ribs can be about 0.9 inches.

The containers 100 and 200 can be blow molded from an injection molded preform made from, for example, PET, PEN or blends thereof, or can be extrusion blow molded plastic, for example, polypropylene (PP). In addition, the containers 100 and 200 can be multilayered, including a layer of gas barrier material or a layer of scrap material. Resins also include polyester resins modified to improve UV resistance, for example Heatwave™ CF246, available from Voridian (Kingsport, Tennessee, U.S.A.). The finishes of the containers can be injection molded, i.e. the threaded portion can be formed as part of the preform, or can be blow molded and severed from an accommodation feature formed thereabove, as is known in the art.

The above described containers 100 and 200 are capable of use, for instance, in hot-fill operations having fill temperatures up to about 205° F. As explained above, containers 100 and 200 having base 112 and 212 can be utilized when processing temperatures approach or exceed 205° F. The containers can also be utilized in typical pasteurization processes used in the packaging art. In an exemplary process, a cold solid product, such as pickles, is combined with mildly heated brine at 120 to 140° F. within the container. After the container is capped, the filled container can be processed through a pasteurization tank, where temperatures approach about 212° F., so that the solid products in the sealed container are heated to approximately 175° F. for 15 minutes before the filled and sealed container is cooled to ambient temperature.

The present invention provides a container 10 which is particularly suited for use as a jar for packaging food products. For example, the container 10 can be used to package fluent or semi-fluent food products such as applesauce, spaghetti sauce, relishes, sauerkraut, baby foods, and the like. It can also be used to package a solid food product suspended in a liquid brine, such as pickles. Thus, the container 10 can be utilized for packaging various food products and can withstand various fill and treatment operations, as will be discussed.

Figure 10:
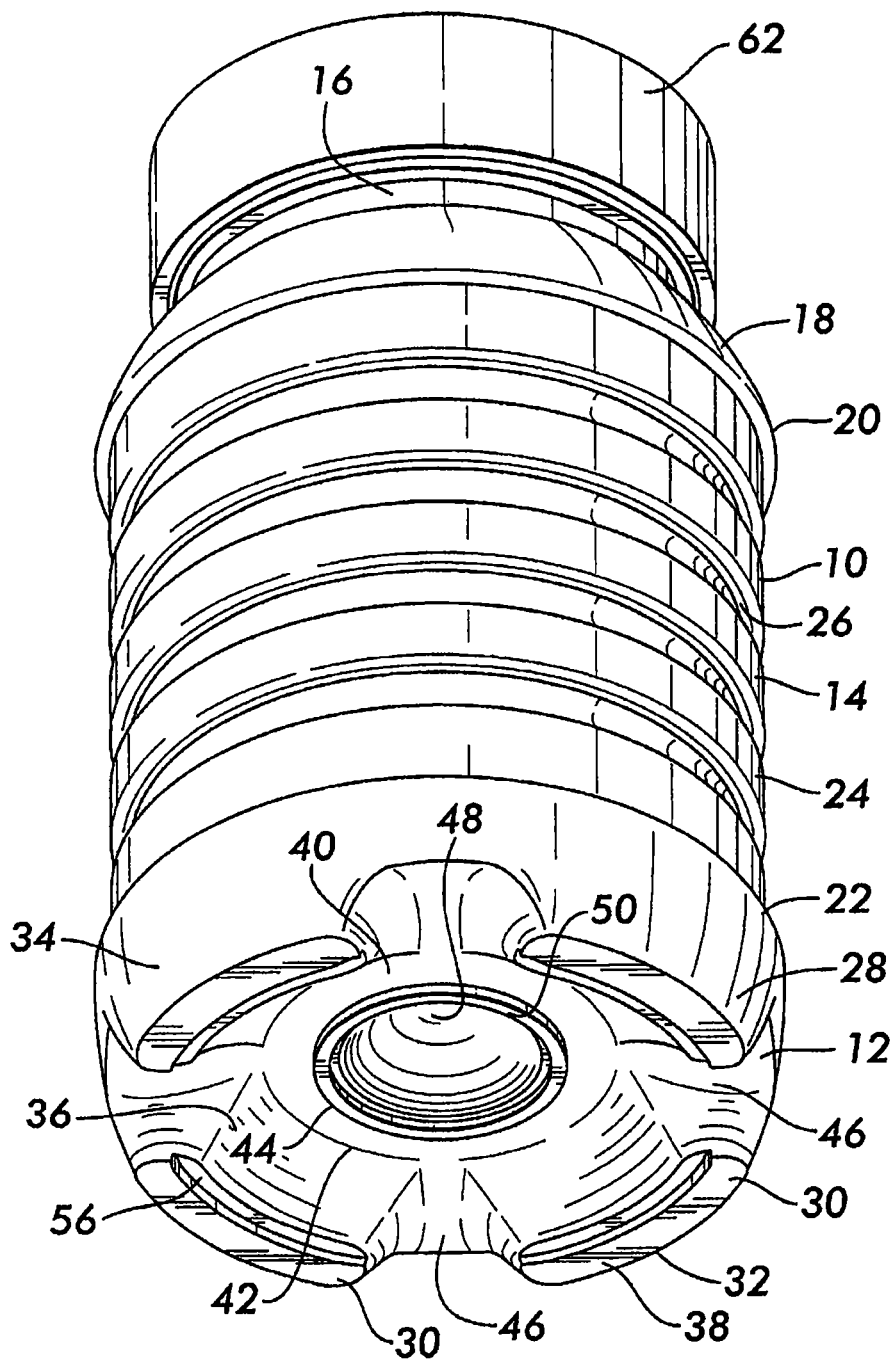
FIG. 10 is a perspective view of a container having a base embodying the present invention.
Figure 11:
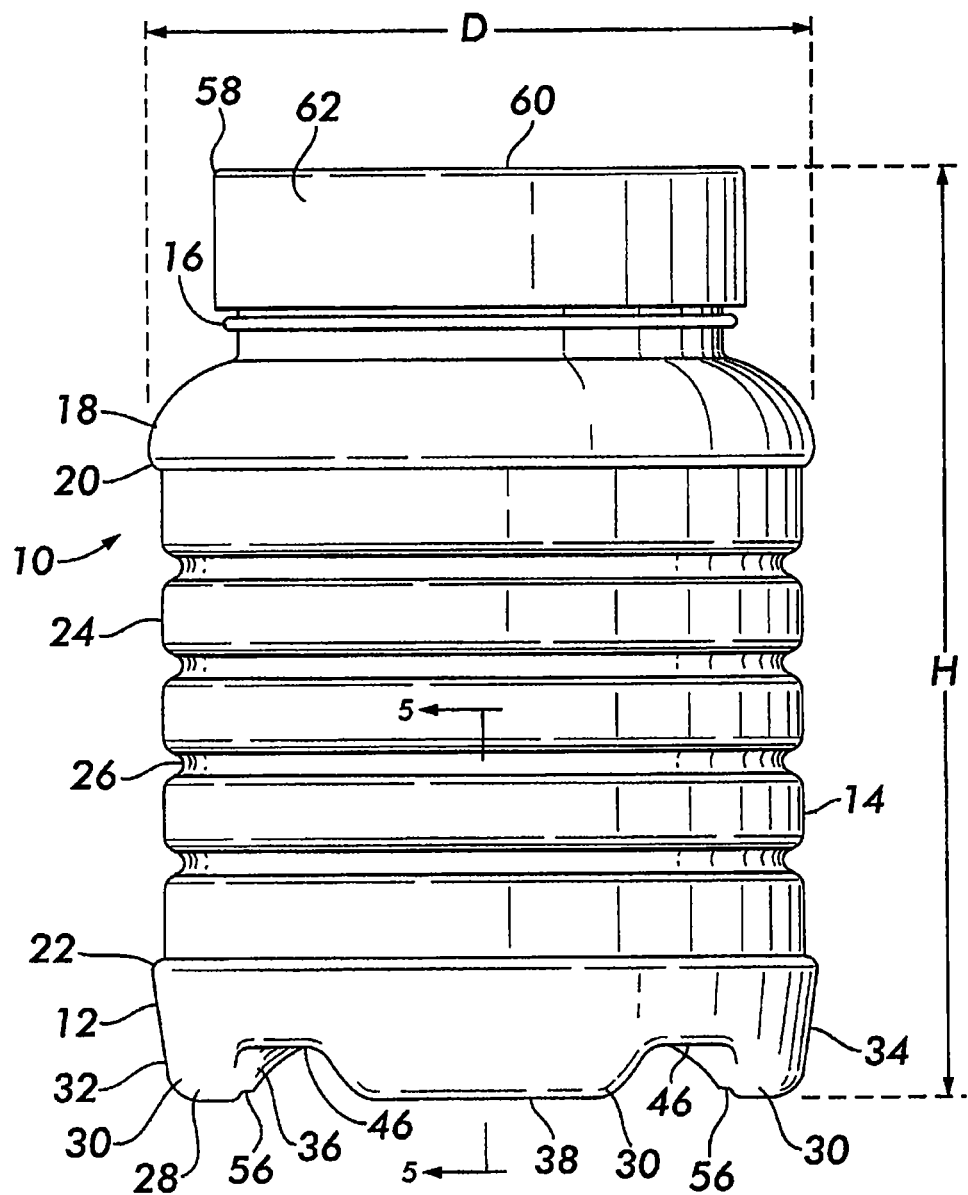
FIG. 11 is an elevational view of the container illustrated in FIG. 10.
Figure 12:
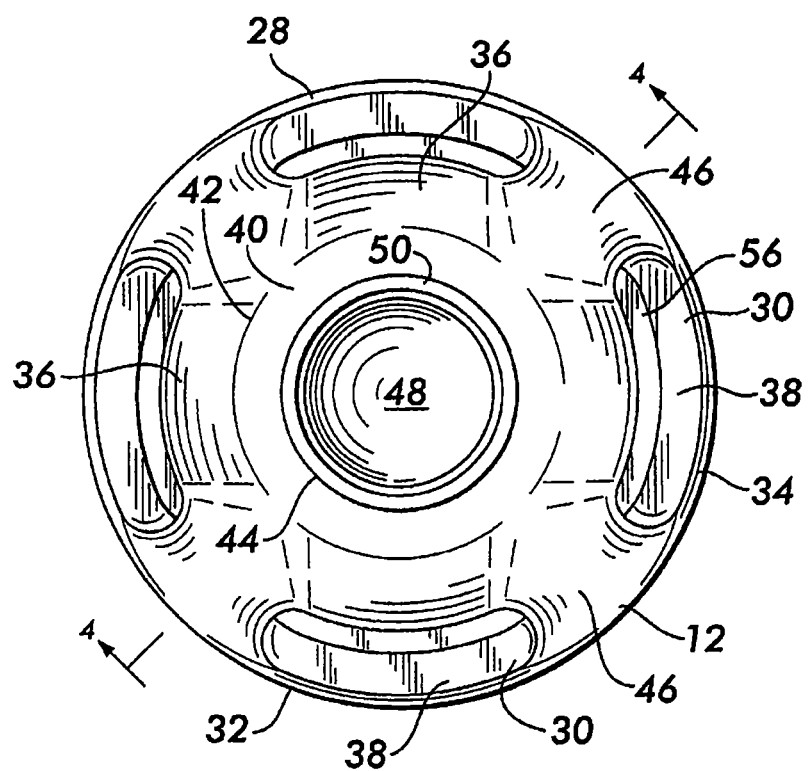
FIG. 12 is bottom plan view of the base illustrated in FIG. 10.

As illustrated in FIG. 10, in one preferred embodiment of the present invention a container 10 is provided having a base 12, a substantially cylindrical sidewall 14, and a wide-mouth threaded finish 16 which projects from the upper end of the sidewall 14 via a shoulder 18. Preferably, as illustrated, upper and lower label bumpers, 20 and 22, are located adjacent the shoulder 14 and base 12, respectfully, and outline a substantially cylindrical label area 24 on the sidewall 14. Thus, a label (not shown) can be attached to, and extend completely around, the container sidewall 14. In addition, preferably the sidewall 14 has a series of circumferential grooves 26 which reinforce the cylindrical shape of the sidewall 14 and resist paneling, dents and other unwanted deformation of the sidewall 14.

The container 10 is multi-functional since it can be utilized in hot-fill as well as pasteurization/retort processing. To accomplish this objective, the base 12 has a structure which is capable of accommodating elevated internal container pressure experienced during pasteurization/retort processing and which is capable of accommodating reduced container volume experienced upon cool down of a filled and sealed container after hot-fill or pasteurization/retort processing. To this end, the base 12 flexes downwardly in a controlled manner and to a desired extent when pressure within the filled and sealed container is elevated, and the base 12 flexes upwardly in a controlled manner and to a desired extent when a vacuum develops within the filled and sealed container.

Structurally, the base 12 includes a discontinuous concave outer annular wall 28 which provides a plurality of spaced-apart, arcuate supports 30 adjacent the outer periphery 32 of the base 12. As illustrated, four supports 30 are utilized in the preferred embodiment; however, three, five or more supports 30 could also be utilized. Each support 30 has an outer wall portion 34 which extends upwardly toward the lower label bumper 22 and an inner wall portion 36 which extends upwardly and inwardly into the remaining base structure as will be discussed. A standing surface 38 is formed at the juncture of each outer and inner wall portions, 34 and 36, thereby forming a discontinuous support ring of the container 10.

An inner annular wall 40 extends within the discontinuous concave outer annular wall 28 and is preferably slightly inclined relative to the horizontal. Preferably, the inclined inner annular wall 40 extends upwardly and inwardly at an angle "A" relative to the horizontal as it extends from its outer periphery 42 to its inner periphery 44. For example, the inner annular wall 40 can incline at an angle "A" in a range of about 5° to about 6° relative to a horizontal plane "P" extending through the standing surfaces 38. Alternatively, the inner annular wall 40 can be formed substantially planar and parallel to a horizontal plane "P" extending through the standing surfaces 38.

Figure 13:
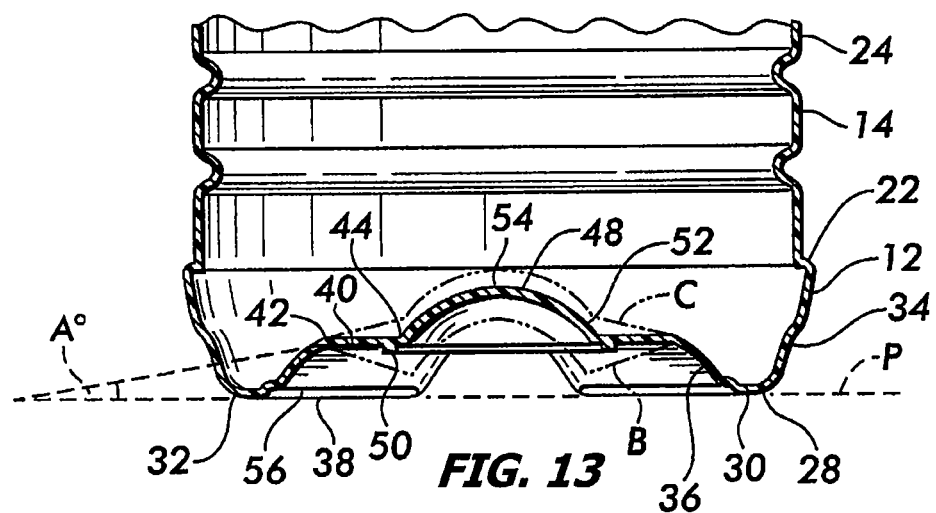
FIG. 13 is a cross-sectional view of the base taken along line 4-4 of FIG. 12.

The outer periphery 42 of the inner annular wall 40 merges with the inner wall portion 36 of each of the supports 30 and with a plurality of spaced-apart, horizontally-disposed, radial webs 46 located adjacent the outer periphery 32 of the base 12. Each of the webs 46 extends between the supports 30 and connects to the container sidewall 14 at an elevation above the horizontal plane "P" extending through the standing surfaces 38. The inner periphery 44 of the inner annular wall 40 merges into an anti-inverting dome 48 which projects upwardly into the container 10. Preferably, the inner annular wall 40 and anti-inverting dome 48 merge via an annular hinge 50. As illustrated in FIG. 13, the anti-inverting dome 48 has a conical lower portion 52 adjacent hinge 50 and a convex upper portion 54.

The inner annular wall 40 functions as a flex panel. To this end, when the internal pressure increases within a filled and sealed container, the inner annular wall 40 flexes downwardly as shown in dashed lines "B" in FIG. 13 to accommodate the increased pressure and prevent the sidewall 14 of the container 10 from undergoing unwanted permanent distortion. In addition, the inner annular wall 40 flexes upwardly to relieve vacuum when the contents of a hot filled and capped container, or a filled, capped and subsequently pasteurized container, cool to ambient. This is shown in dashed lines "C" in FIG. 13. Thus, when the sealed container and contents cool to ambient, the sidewall 14 is substantially cylindrical and unchanged from its as-formed shape and is capable of neatly supporting a wrap-around label without unwanted voids or the like beneath the label. In addition, the sidewall 14 resists ovalization and the base 12 provides a level seating surface which is not subject to rocking or the like.

The anti-inverting dome 48, the supports 30 and the radial webs 46 support the inner annular wall 40 and permit it to flex only within a desired range of movement as illustrated by dashed lines "B" and "C". For instance, the inner annular wall 40 flexes downwardly due to an increase in pressure within the container, but is prevented from complete inversion and failure by the anti-inverting dome 48 which travels with the inner annular wall 40 but substantially maintains a constant shape regardless of the internal pressure experienced within the container.

Figure 14:
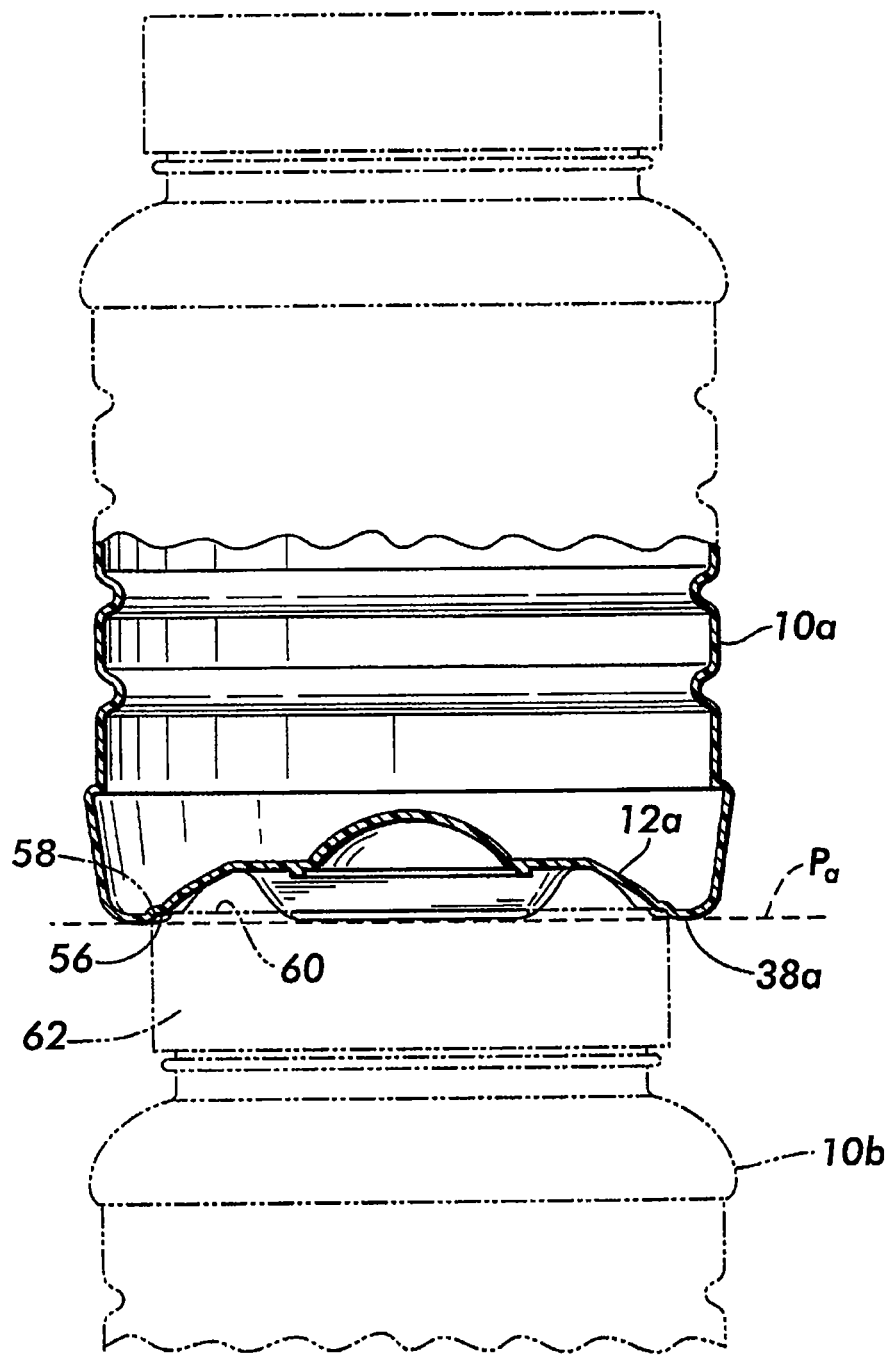
FIG. 14 is a cross-sectional view of the base taken along line 5-5 of FIG. 11 and illustrates a pair of containers in a stacked arrangement.

Another feature of the base 12 of the present invention is that each inner wall portion 36 of the arcuate supports 30 has an arcuate shoulder, or support ridge, 56 formed therein and spaced in elevation from both the support surfaces 38 and the inner annular wall 40 to facilitate vertical stacking of like containers 10. For example, as illustrated FIG. 14, an upper container 10a is stacked on a lower container 10b. The support ridge 56 in the base 12a of the upper container 10a seats on the outer edge 58 of the upper surface 60 of the lid 62 of the lower container 10b such that the horizontal plane "Pa" extending through the standing surfaces 38a of the upper container 10a extends a spaced distance beneath the top surface 60 of the lid 62 of the lower container 10b.

By way of example, and not by way of limitation, the container 10 according to the present invention preferably has a height "H" of about 5.8 inches, a container outermost diameter "D" of about 4.2 inches, and contain a capacity of about 32 fluid ounces. The discontinuous standing ring formed by the standing surfaces 38 has a diameter of about 3.6 inches, and the inner annular wall 40 of the base 12 has an inner periphery 44 with a diameter of about 1.6 inches and an outer periphery 42 with a diameter of about 2.2 inches. The radial webs 46 are uniformly spaced apart and separate each support 30 such that each support 30 is at least about 0.8 radians. In addition, each support 30 has a slightly larger arcuate extent than that of each radial web 46.

Preferably, the container 10 is blow molded from an injection molded preform made of PET, PEN or blends thereof or is extrusion blow molded of PP. In addition, the container 10 may be multilayered including a layer of gas barrier material or a layer of scrap material. Preferably, the finish 16 of the container is threaded, blow molded, and severed from an accommodation feature formed thereabove.

The above described container 10 is capable of use in hot-fill operations having fill temperatures up to 205° F. It can also be utilized in pasteurization processes wherein a cold solid product, such as pickles, is combined within the container 10 with mildly heated brine at 120 to 140° F. After the container 10 is capped, the filled container can be processed through a pasteurization tank where temperatures approach about 212° F. so that the solid products in the sealed container are heated to approximately 175° F. for 15 minutes before the filled and sealed container is cooled to ambient temperature.

While preferred containers and base structures have been described in detail, various modifications, alterations and changes may be made without departing from the spirit and scope of the present invention as defined in the appended claims.

What is claimed is:

1. A method comprising:
blow-molding a PET plastic container in an as-formed condition, the container in the as-formed condition comprising:
 a threaded finish having a mouth;
 a shoulder connecting the finish to a substantially cylindrical sidewall, the substantially cylindrical sidewall extending from the shoulder to a circular base, the base having a diameter D greater than a diameter of the sidewall, and the sidewall adapted to neatly support a wrap-around label without unwanted voids beneath the label;
 an upper label bumper adjacent the shoulder;
 a lower label bumper adjacent the base;
 the base of the container in the as-formed condition comprising:
  an outer annular wall having an outer portion extending from the lower label bumper to the standing surface and an inner portion, forming a standing ring therebetween;
  a continuous inner annular wall radially inside of the standing ring and extending inwardly from said inner portion of the outer annular wall and having an inner periphery, at least a portion of the inner annular wall forming a flex panel, the flex panel in the as-formed condition positioned in a first position in which at least a portion of the flex panel is inclined in a radially inward direction in the range of five to six degrees upwardly relative to a horizontal plane P extending through the standing ring, the inner annular wall comprising a downwardly curved concave portion adjacent the inner portion of the outer annular wall and above the plane P of the standing ring;
  an anti-inverting dome projecting upwardly into the container, the inner periphery of the inner annular wall merging into the anti-inverting dome via a first annular hinge, the anti-inverting dome having a conical lower portion adjacent the first annular hinge;
filling the container with a hot product;
sealing and capping the filled container;
in response to elevated pressure from within the filled, sealed and capped container, moving the flex panel of the filled, sealed and capped container downwardly from the first position into a second position B below the first position and above the standing ring to relieve pressure in the sealed and capped container, the elevated pressure pushing the flex panel downwardly into the second position and the anti-inverting dome travelling downwardly with the flex panel and maintaining a generally constant shape regardless of the pressures experienced within the filled, sealed and capped container, the anti-inverting dome preventing complete inversion and failure of the inner annular wall;
cooling the container after the filling, sealing and capping;
reducing a volume of the sealed container by moving the flex panel upwardly into a third position C above the first and second positions in response to a vacuum created by the cooling, the vacuum pulling the flex panel upwardly into the third position;
relieving the vacuum by reducing the volume of the sealed container;
the sidewall neatly supporting a wrap-around label without unwanted voids beneath the label;

preventing permanent distortion of the filled, sealed and capped container by moving the flex panel up and down, above and below the as-formed position, between and amongst the first, second, and third positions and limiting the flex panel to flex only within a desired range of movement, the desired range defined by the second and third positions.

2. The method of claim 1, wherein the hot product is fluent.

3. The method of claim 1, wherein the hot product is food.

4. The method of claim 1, wherein the hot product is a hot fluid food product.

5. The method of claim 1, wherein the elevated pressure is caused by said filling with the hot product and said sealing and capping the container.

6. The method of claim 1, further comprising, after said filling with the hot product and said sealing and capping the container, subjecting the filled, sealed and capped container to a pasteurization process, the elevated pressure being caused by said pasteurization process.

7. The method of claim 1, further comprising, after said filling with the hot product and said sealing and capping the container, subjecting the filled, sealed and capped container to a retort process, the elevated pressure being caused by said retort process.

8. The method of claim 1, further comprising:
after said filling with the hot product and said sealing and capping the container, subjecting the filled, sealed and capped container to a pasteurization process; and
after said filling with the hot product and said sealing and capping the container, subjecting the filled, sealed and capped container to a retort process.

9. The method of claim 1, wherein the portion of the flex panel inclined in a radially inward direction in the range of five to six degrees upwardly extends from the anti-inverting dome to the downwardly curved concave portion.

10. A method comprising:
blow-molding a PET plastic container in an as-formed condition, the container in the as-formed condition comprising:
a threaded finish having a mouth;
a shoulder connecting the finish to a substantially cylindrical sidewall, the substantially cylindrical sidewall extending from the shoulder to a base, the base having a diameter D greater than a diameter of the sidewall, and the sidewall adapted to neatly support a wrap-around label without unwanted voids beneath the label;
an upper label bumper adjacent the shoulder;
a lower label bumper adjacent the base;
the base of the container in the as-formed condition comprising:
an outer annular wall having an outer portion extending from the lower label bumper to the standing surface and an inner portion, forming a standing ring therebetween;
a continuous inner annular wall radially inside of the standing ring and extending inwardly from said inner portion of the outer annular wall and having an inner periphery, at least a portion of the inner annular wall forming a flex panel, the flex panel positioned in a first position in which at least a portion of the flex panel is inclined in a radially inward direction upwardly relative to a horizontal plane P extending through the standing ring;
an anti-inverting dome projecting upwardly into the container, the inner periphery of the inner annular wall merging into the anti-inverting dome via a first annular hinge, the anti-inverting dome having a conical lower portion adjacent the first annular hinge;
filling the container with a hot product;
sealing and capping the filled container;
in response to elevated pressure from within the filled, sealed and capped container, moving the flex panel of the filled, sealed and capped container downwardly from the first position into a second position B below the first position and above the standing ring, the anti-inverting dome travelling with the flex panel and maintaining a generally constant shape regardless of the pressures experienced within the filled, sealed and capped container, the anti-inverting dome preventing complete inversion and failure of the inner annular wall;
cooling the container after the filling, sealing and capping;
reducing a volume of the sealed container by moving the flex panel upwardly into a third position C above the first and second positions in response to a vacuum created by the cooling;
relieving the vacuum by reducing the volume of the sealed container;
the sidewall neatly supporting a wrap-around label without unwanted voids beneath the label;
preventing permanent distortion of the filled, sealed and capped container by moving the flex panel up and down, above and below the as-formed position, between the first, second, and third positions and limiting the flex panel to flex only within a desired range of movement, the desired range defined by the second and third positions.

11. The method of claim 10,
wherein the inner annular wall comprises a downwardly curved concave portion adjacent the inner portion of the outer annular wall, and
wherein the portion of the flex panel inclined in a radially inward direction upwardly extends from the anti-inverting dome to the downwardly curved concave portion.

12. The method of claim 10, further comprising:
after said filling with the hot product and sealing and capping the container, subjecting the filled, sealed and capped container to a pasteurization process; and
after said filling with the hot product and sealing and capping the container, subjecting the filled, sealed and capped container to a retort process.

13. A method comprising:
forming plastic container in an as-formed condition, the container in the as-formed condition comprising:
a shoulder connecting to a substantially cylindrical sidewall, the substantially cylindrical sidewall extending from the shoulder to a substantially circular base;
an upper label bumper adjacent the shoulder;
a lower label bumper adjacent the base;
the base of the container in the as-formed condition comprising:
an outer annular wall having an outer portion extending from the lower label bumper to a standing surface and an inner portion, forming a standing ring therebetween;
an inner annular wall radially inside of the standing ring and extending inwardly from said inner portion of the outer annular wall and having an inner periphery, at least a portion of the inner annular wall forming a flex panel, the flex panel in the as-formed condition positioned in a first position in which at least a portion of the flex panel is at an angle relative to a horizontal plane extending through the standing ring;

an anti-inverting dome projecting upwardly into the container, the inner periphery of the inner annular wall merging into the anti-inverting dome via a first annular hinge, the anti-inverting dome having a conical lower portion adjacent the first annular hinge;

filling the container with a hot product;

sealing and capping the filled container;

moving the flex panel downwardly from the as-formed position into a second position below the first position, the anti-inverting dome travelling downwardly with the flex panel and maintaining a generally constant shape regardless of the pressures experienced within the filled, sealed and capped container, the anti-inverting dome preventing complete inversion and failure of the inner annular wall;

cooling the container after the filling, sealing and capping;

reducing a volume of the sealed container by moving the flex panel upwardly into a third position in response to vacuum created by the cooling, the vacuum pulling the flex panel upwardly into the third position;

the sidewall supporting a wrap-around label;

preventing permanent distortion of the filled, sealed and capped container by moving the flex panel between and amongst the first, second, and third positions.

14. The method of claim 1, wherein the angle is in the range of five to six degrees relative to the horizontal plane P extending through the standing ring.

15. The method of claim 13, wherein the angle is five degrees or greater, relative to the horizontal plane P extending through the standing ring.

16. The method of claim 13, further comprising:

after said filling with the hot product and sealing and capping the container, subjecting the filled, sealed and capped container to a pasteurization process; and after said filling with the hot product and sealing and capping the container, subjecting the filled, sealed and capped container to a retort process.

\* \* \* \* \*